United States Patent
Kaushik et al.

(10) Patent No.: US 10,601,896 B2
(45) Date of Patent: Mar. 24, 2020

(54) CONCURRENT ACCESS TO A USER PROFILE IN A LAYERING SYSTEM

(71) Applicant: Wyse Technology L.L.C., Santa Clara, CA (US)

(72) Inventors: Puneet Kaushik, Fremont, CA (US); Rushikesh Patil, Sunnyvale, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 429 days.

(21) Appl. No.: 15/153,596

(22) Filed: May 12, 2016

(65) Prior Publication Data

US 2017/0331878 A1    Nov. 16, 2017

(51) Int. Cl.
*H04L 29/08* (2006.01)
*G06F 16/10* (2019.01)

(52) U.S. Cl.
CPC .............. *H04L 67/06* (2013.01); *G06F 16/10* (2019.01); *H04L 67/2842* (2013.01); *H04L 67/306* (2013.01)

(58) Field of Classification Search
CPC ....................................................... H04L 67/06
USPC .......................................................... 709/203
See application file for complete search history.

(56) References Cited

U.S. PATENT DOCUMENTS

| | | | |
|---|---|---|---|
| 8,943,203 B1 * | 1/2015 | Lent | G06F 9/4868 709/226 |
| 2005/0169073 A1 * | 8/2005 | Cook | G06F 9/44584 365/202 |
| 2013/0091210 A1 * | 4/2013 | Rajakarunanayake | H04W 4/21 709/204 |
| 2016/0342336 A1 * | 11/2016 | Mylvara | G06F 3/0607 |

\* cited by examiner

*Primary Examiner* — Adnan M Mirza
(74) *Attorney, Agent, or Firm* — Kirton McConkie; Brian Tucker

(57) ABSTRACT

Concurrent access to a user profile in a layering system is provided. When a user logs into a computing device, the server can locate a corresponding user profile to identify which layers should be provided to the user. Rather than sending these layers to the computing device for mounting, the server can mount the layers on the server. Therefore, if a user logs into multiple computing devices, the layering file system and registry filter drivers on those devices can route file system and registry requests to the server where the layers are mounted. Since the layers are mounted to a single device, concurrent access can be provided without the concern of data conflicts.

20 Claims, 25 Drawing Sheets

CONCURRENT ACCESS TO A USER PROFILE IN A LAYERING SYSTEM

CROSS-REFERENCE TO RELATED APPLICATIONS

N/A

BACKGROUND

The present invention is generally directed to enabling concurrent access to a user profile in a layering system. A layering system is a tool that enables an operating system, user applications, and user data to be layered on the user's computing device. When using a layering system, layered applications and data are executed natively on the user's computing device without the use of a virtual machine or other sandboxed execution environment. This native execution will therefore cause the layered applications to appear, both to the user and to other applications, as if they were being executed in a "normal" manner. This is in contrast to many types of virtualization techniques such as terminal services and application virtualization where it is typically clear that the applications are executed in a separate environment.

U.S. patent application Ser. Nos. 14/719,248 and 14/719,256 are both directed to a layering system and provide a background for the present invention. The content of these applications is therefore incorporated by reference. It is noted that both of these applications are commonly owned and would not constitute prior art to the present invention. Therefore, this background should not be construed as admitting prior art, but should be construed as describing various features on which the present invention is based and that may even form part of the present invention.

As is described in the '248 and '256 applications, a layer is a collection of data or resources which enables the collection to be isolated or set apart from the data or resources in another layer. To summarize this layering, FIG. 1 provides simplified examples of a user data layer 101 and an application layer 102. It is noted that a layer containing an operating system may also exist. Each layer can be stored in a manner that allows the layer to be separately mounted for access. For example, each layer may comprise a separate partition of a disk (including of a virtual disk), a folder, a network share, etc. The ability to separately mount a layer allows the layering system to selectively provide access to particular layers. It will be assumed that the layering system determines that user data layer 101 and application layer 102 should be mounted in response to the user logging in to a computing device on which the layering system executes or which the layering system otherwise controls.

As shown in FIG. 1 and for simplicity, application layer 102 includes a single application, WINWORD.EXE, which is the executable for Microsoft Word. Word also requires a number of registry settings to execute properly, and therefore, application layer 102 also includes such registry settings. It is noted that these registry settings, which would normally be stored within the registry of the operating system, could be stored within application layer 102 in a registry hive. Of course, a typical installation of Word would require a number of other files and/or settings which are not depicted. Application layer 102 also includes layer metadata which describes the content of application layer 102 (e.g., which describes that the layer includes WINWORD.EXE and whatever structure is used to store the Word registry settings). This layer metadata is critical because it allows the layering system to quickly determine what exists on the layer.

User data layer 101 is structured in a similar way. However, as a user data layer, it stores the user's files which in this case constitute two Word documents: Report.docx and Summary.docx. As with application layer 102, user data layer 101 may also store a number of other files including configuration files that may be particular to this user (e.g., a template file for Word). User data layer 101 also includes layer metadata which defines the content of the layer. Again, this layer metadata is critical because it allows the layering system to quickly determine what exists on the layer.

As mentioned above, a layer can be a separately mountable portion of a storage device (whether physical or virtual) such as a partition, folder, network share, etc. Accordingly, when the user logs on to a computing device, the layering system can mount layers 101 and 102 so that the user will have access to MS Word and his documents which are included in these layers. However, if a different user were to log in to the same computing device, the layering system could instead mount an application layer and user data layer pertaining to the different user so that the different user can only access the applications and user data defined in those layers.

The process by which the user accesses the data and resources included on each layer is provided in the '248 and '256 applications and will not be described in detail in this specification. By way of an overview, the layering system includes a file system filter driver and a registry filter driver which can function to intercept and redirect file system and registry operations as appropriate. In particular, these filters can be registered with the OS so that they will receive all file system and registry operations respectively. If a file system or registry operation pertains to content of a layer rather than to content of the file system or registry directly provided by the OS, the filters can redirect the operation to the corresponding layer. The '248 and '256 applications provide a number of examples of this type of redirection.

The result of this redirection is that, from the user perspective, the files of the layers do not appear to be stored in a different manner than any other file would typically be stored by the OS. For example, if the user data layer 101 were assigned a volume of E:, the layering system could cause the files to appear as if they were stored in the typical C: volume. In other words, the fact that multiple volumes may be loaded is abstracted (and even hidden) from the user perspective. It is again reiterated that the use of layer metadata to define what is stored on each layer allows this process to be carried out efficiently as is described in the '248 and '256 applications.

FIGS. 2A and 2B each illustrate an example of how the layering system can function. Each of these examples involve the layering file system filter driver (or LFFD) 201 and its role in determining whether to redirect a file open request. It is noted that a similar process would be carried out by the layering registry filter driver (or LRFD) if the operation pertained to the registry.

As shown in FIGS. 2A and 2B, it will be assumed that the operating system provides a file system 200 for handling I/O to the various mounted partitions. It will also be assumed that the operating system has mounted a C: volume and that the layering system has mounted an E: volume that corresponds to user data layer 101. In the following description, the E: volume and user data layer 101 (or simply layer) will be used interchangeably. Because of the layering system, even though the E: volume is a separate volume from the C:

volume, the contents of the E: volume will appear as if they were stored on the C: volume. In other words, the layering system can make it appear as if a single volume were mounted.

Accordingly, if the user selects to open the Report.docx file that is stored on the E: volume, a file open request 210 of C:\Docs\Report.docx may be generated. As is described in the '248 and '256 applications, LFFD 201 is registered as a filter driver for file system 200 and therefore will receive the opportunity to evaluate file open request 210. LFFD 201 can evaluate the target of file open request 210 against the layer metadata of the E: volume (and possibly against layer metadata of any other mounted layer) to determine if the request pertains to the layer. In this case, it will be assumed that the layer metadata indicates that the E: volume includes the path \Docs and that the Report.docx file is stored in the path. As a result, LFFD 201 can modify file open request 210 to create modified file open request 210a of E:\Docs\Report.docx. Modified file open request 210a is then passed to file system 200 which will open Report.docx from the appropriate location on the E: volume. LFFD 201 can perform this type of rerouting for any I/O that pertains to content stored on the E: volume. The determination of whether I/O pertains to content on a particular layer is based on the layer metadata for that particular layer.

FIG. 2B illustrates the case where LFFD 201 determines that a file open request 220 does not pertain to a layer (or at least does not pertain to a layer separate from the layer that includes the operating system). In this example, file open request 220 is directed to File.txt which is stored in a Downloads folder that is assumed to exist on the C: volume. Upon receiving file open request 220, LFFD 201 will evaluate the request against the layer metadata for the E: volume and determine that the E: volume does not include a path of \Downloads. Accordingly, LFFD 201 can allow file open request 220 to pass to file system 200 without modification since the request already includes the correct path to File.txt.

To summarize, LFFD 201 selectively modifies I/O requests so that they are directed to the appropriate layer. In the case of registry access, the LRFD would perform similar functionality to ensure that the registry access is directed to the appropriate layer. It is again reiterated that this rerouting is necessary because the layering system causes the layers to be hidden from the user's perspective while still being visible to the underlying file system.

In typical systems that implement this type of layering, there may be multiple layers mounted that each provide applications to the user. FIG. 3 illustrates an example of this. As shown, a system may include an operating system partition 301 (which may or may not be a layer) on which the operating system 302 and registry hive 303 are stored. Registry hive 303 can include configuration settings of operating system 302 and possibly of any application on operating system partition 301 or any application that may be executed on the system. As an example, operating system partition 301 can represent a typical partition of a system's hard drive or may represent a vdisk. When operating system 302 executes, it will load registry hive 303 into the registry where the configuration settings can be accessed (e.g., via the configuration manager) by the operating system and other processes/threads.

FIG. 3 also illustrates two application layers 311, 321 that are assumed to have been mounted by layering file system filter driver (LFFD) 330 on the system. As an example, each of application layers 311, 321 could be a separate drive, a separate partition of a drive, a VHD, a network share, a mounted folder, etc. Application layer 311 includes applications 312a and 312b while application layer 321 includes applications 322a and 322b. Application layers 311 and 321 also include registry hives 313 and 323 respectively which store the configuration settings for the applications on the respective application layer. For example, registry hive 313 can store any registry keys and corresponding values employed by application 312a or application 312b while registry hive 323 can store any registry keys and corresponding values employed by application 322a or application 322b. Although not shown, each application layer 311, 321 can include layer metadata (of which registry hives 313, 323 form a part).

As described in the '248 and the '256 applications, when a layer is mounted, LFFD 330 can load the layer's registry hive into the registry where it can be accessed using typical registry operations. Layering registry filter driver (LRFD) 340 can be registered with the configuration manager of operating system 302 to receive any calls to access the registry. When LRFD 340 receives a registry operation it can access the layer metadata of each layer to determine to which registry hive the registry operation should be directed. LRFD 340 can then modify the registry operation so that it includes the correct path.

FIGS. 3A-3C illustrate an example of how each of registry hives 303, 313, and 323 can be loaded into the registry. In FIG. 3A, the operating system's registry hive 303 is shown as being loaded. For simplicity, registry hive 303 is shown as including a subkey (\SOFTWARE\Microsoft\Windows\CurrentVersion) that has a single value (CommonFilesDir) with data of C:\Program Files\Common Files. When this subkey is loaded into registry 450, it will be positioned under the HKLM key as shown. Therefore, any request to access the CommonFilesDir value will specify a path of (or more particularly, will provide a handle to) HKLM\SOFTWARE\Microsoft\Windows\CurrentVersion.

FIG. 3B illustrates how registry hive 313 can be loaded into registry 450 when application layer 311 is mounted. Registry hive 313 is shown as including a subkey (\SOFTWARE\Vendor1\Key1) that has a single value (InstallDirectory) with data of C:\Program Files\Vendor1\Dir1. Although this subkey may have a similar path as the CommonFilesDir subkey (i.e., although this subkey falls under the SOFTWARE subkey), because it is part of a different registry hive, it will be loaded in a unique location. As shown, rather than storing the \SOFTWARE\Vendor1\Key1 subkey under the existing SOFTWARE subkey (which would typically be the case if the corresponding application had been installed on operating system partition 301), the subkey is stored under the subkey AppLayer311. Accordingly, but for LRFD 340, any request to access the InstallDirectory value would need to specify a path of HKLM\AppLayer311\SOFTWARE\Vendor1\Key1. However, as described in the '248 and the '256 applications, LRFD 340 can cause the contents of registry hive 313 to appear as if it were not separate from registry hive 303. In other words, LRFD 340 can cause the value to appear as if it is located at HKLM\SOFTWARE\Vendor1\Key1.

FIG. 3C illustrates how registry hive 323 can be loaded into registry 450 when application layer 321 is mounted. The same process can be performed as described above so that subkey \SOFTWARE\Vendor2\Key1 is stored under the AppLayer321 subkey. Therefore, the EnableUsageStats value can be accessed at the path HKLM\AppLayer321\SOFTWARE\Vendor2\Key1. However, due to the role of LRFD 340, this subkey will appear to applications and the operating system as if it was stored at HKLM\SOFTWARE\Vendor2\Key1.

To implement this abstraction, LRFD 340 intercepts any registry operation to determine whether the operation is directed to a registry hive of one of the mounted layers rather than to the operating system's registry hive. For example, in response to receiving a request to obtain a value of a particular registry subkey, LRFD 340 may be configured to first access registry hive 313 to determine if it includes the key (e.g., by determining whether the subkey is stored under the AppLayer311 subkey). If the subkey is found in registry hive 313, LRFD 340 may respond with its value. However, if the subkey is not found in registry hive 313, LRFD 340 may then access registry hive 323 to perform the same process. If LRFD 340 does not find the subkey in registry hive 323, it would then allow the operating system to fulfill the request in a normal fashion.

Accordingly, LRFD 340 is configured to iteratively access the application layer registry hives when handling a registry operation. If none of the application layer registry hives have the subkey that is the target of the registry operation, LRFD 340 will pass the registry operation on to operating system 302 for normal processing.

To summarize, in a layering system, any number of layers can be mounted to a computing system and the layering file system and registry filter drivers can cause the contents of these layers to appear as if they were stored on the same partition (e.g., as if they were all stored on the C: drive) or within the same registry hive (e.g., under the HKLM\Software key). When a user logs into a computing device that is configured to implement a layering system, a corresponding user profile will dictate which layers are mounted on the computing device. For example, in the case where the layers are provided by a server, the user profile can instruct the server of which layers (e.g., in the form of VHDs) to send to the computing device where they will be mounted.

One problem that exists with this approach is that a user profile can only be applied to a single computing device at a time. In other words, the same user could not log into multiple computing devices at the same time since doing so would cause the same layers to be mounted on multiple different computing devices where their contents could be independently updated thereby resulting in data conflicts. Further, because layers are oftentimes provided as streaming VHDs, the network traffic between the computing device on which the VHD is mounted and the server where the VHD actually exists will be in the form of raw disk blocks. Therefore, there would be few, if any, options for resolving potential data conflicts by examining such network traffic— at least without very complex and sophisticated solutions that would significantly degrade the performance of the layering system. For this reason, a layering solution is typically configured to prevent the same user from being concurrently logged into multiple computing devices.

BRIEF SUMMARY

The present invention extends to methods, systems, and computer program products for enabling concurrent access to a user profile in a layering system. When a user logs into a computing device, the server can locate a corresponding user profile to identify which layers should be provided to the user. Rather than sending these layers to the computing device for mounting, the server can mount the layers on the server. Therefore, if a user logs into multiple computing devices, the layering file system and registry filter drivers on those devices can route file system and registry requests to the server where the layers are mounted. Since the layers are mounted to a single device, concurrent access can be provided without the concern of data conflicts.

In one embodiment, the present invention is implemented by a server as a method for allowing a user profile to be concurrently accessed in a layering system. In response to detecting that a user has accessed a first client device, the server can identify a user profile associated with the user and access the user profile to identify one or more layers that the user should be granted access to. The server can then mount these layers and provide information defining how each of the layers was mounted to layering drivers on the first client device. This will enable the layering drivers to cause contents of the layers to appear as if they were stored on a partition mounted on the first client device. The server can then receive requests to access contents of the one or more layers from the layering drivers on the first client device. The file system of the server can be employed to complete the requests. Results of the requests can then be returned to the layering drivers on the first client device.

In another embodiment, the present invention can be implemented by a client device as a method for allowing a user profile to be concurrently accessed in a layering system. When a layer pertaining to a user of the client device is mounted on a server, the client device can receive information defining how the layer was mounted on the server. Layering drivers on the client device can employ the information to present contents of the layer as if the contents were stored on a partition mounted on the client device. In response to receiving a request that is directed to the partition, the layering drivers can determine that the request targets content on the layer and can modify the request to direct the request to the layer. The layering drivers can then send the modified request to a proxy on the server.

In another embodiment, the present invention can be implemented as a layering system that includes: a server that stores a number of layers that each contain user data and user profiles that each define a layer that should be mounted to the server when a corresponding user logs into a client device, the server also including a proxy for communicating file system or registry requests with client devices; and at least one client device that each include layering drivers that are configured to cause contents of a layer mounted to the server to appear as if the contents were stored on a partition mounted on the client device, wherein the layering drivers are configured to redirect requests to access the contents of a layer to the proxy on the server.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
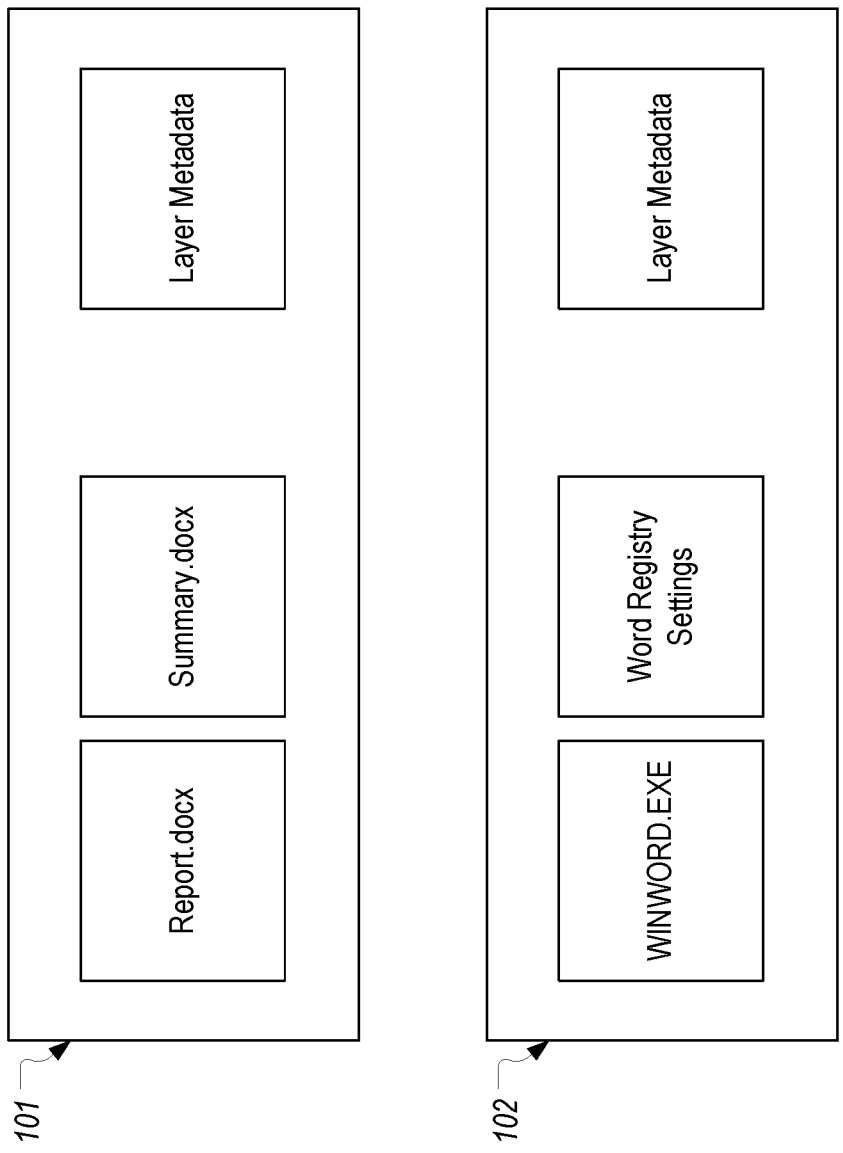
FIG. 1 illustrates simplified examples of layers of a layering system.
Figure 2A:
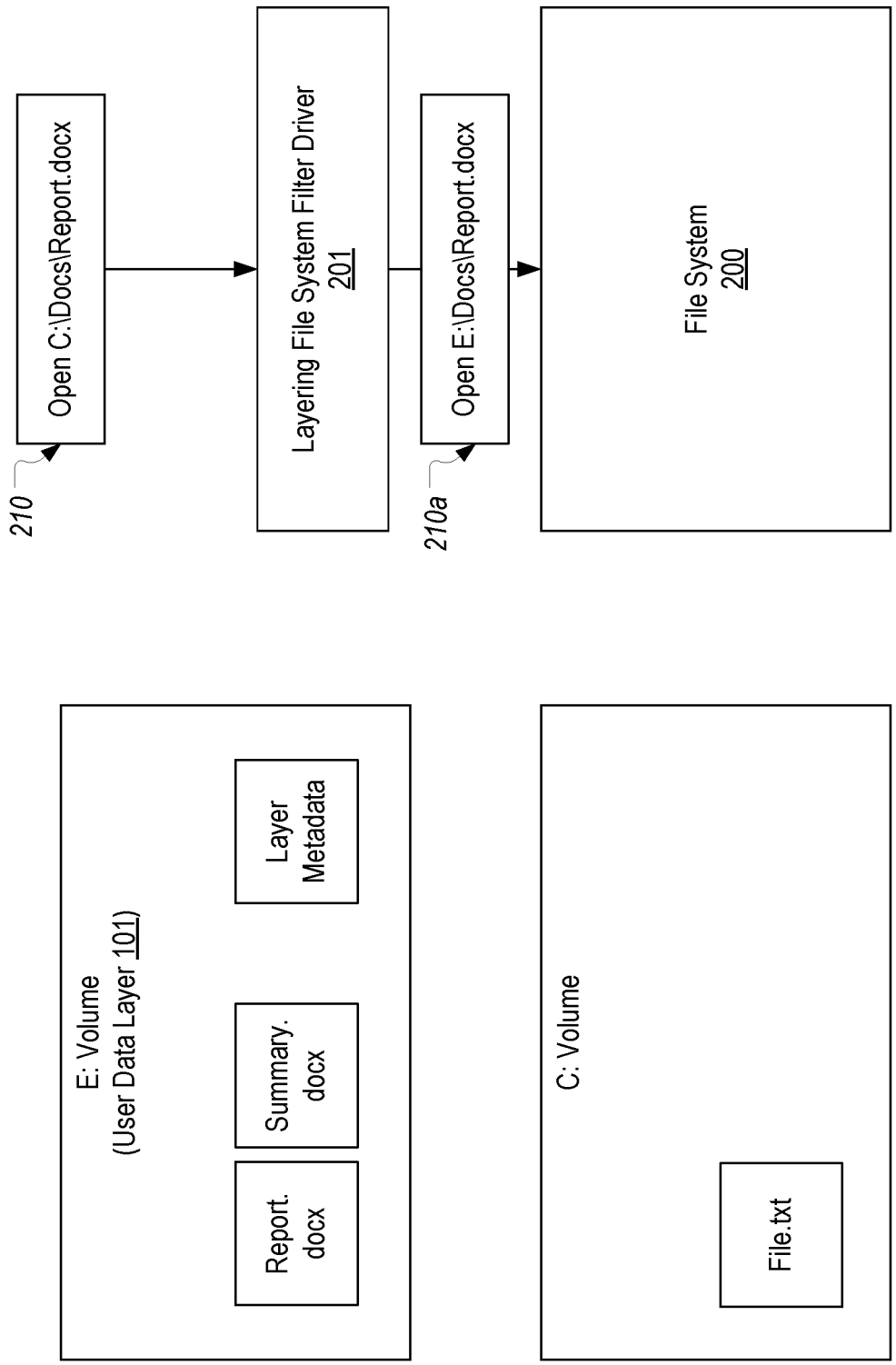
FIGS. 2A and 2B generally illustrate how a layering system can reroute file system or registry operations based on layer metadata of a mounted layer.
Figure 2B:
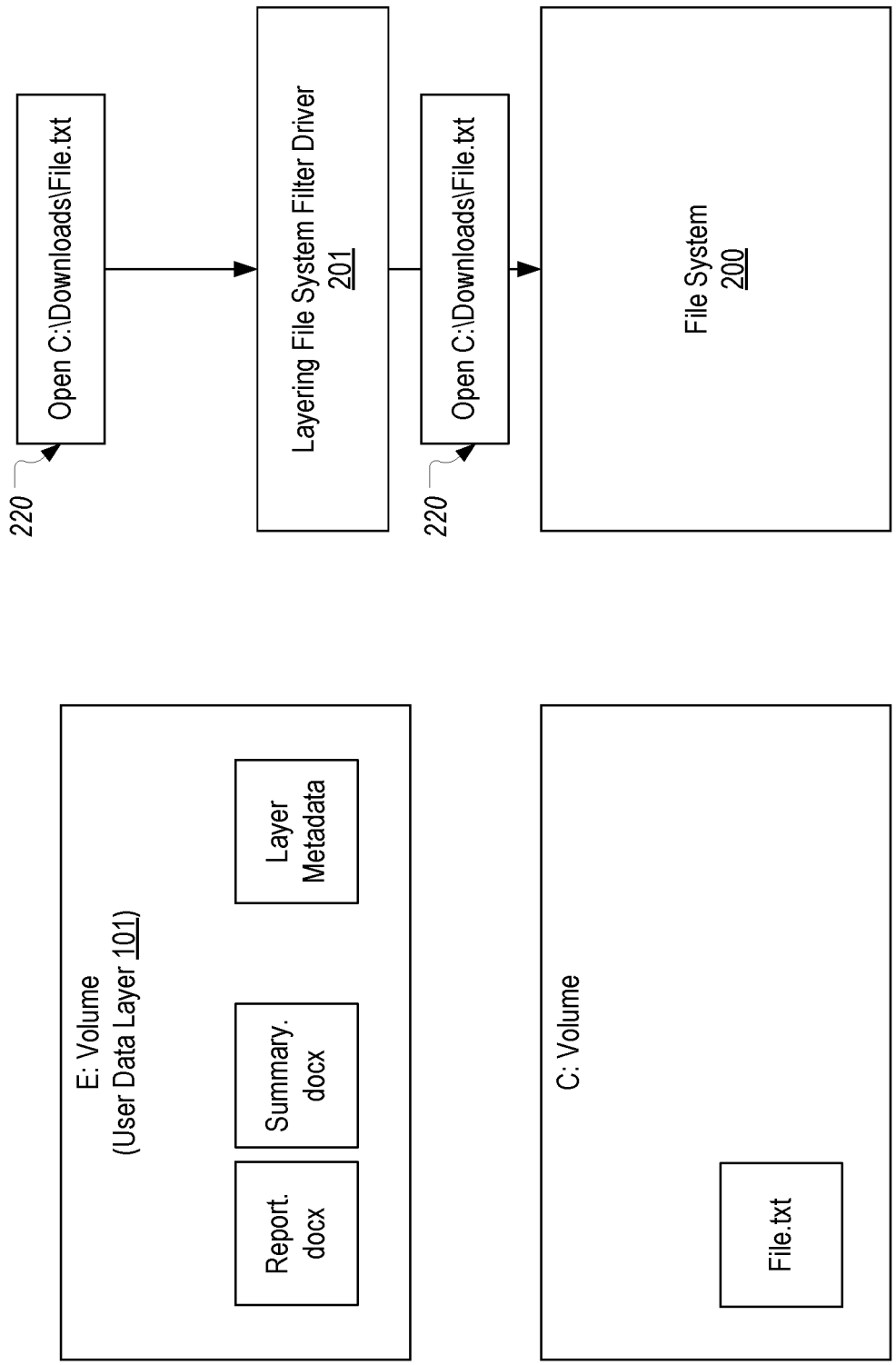
Figure 3:
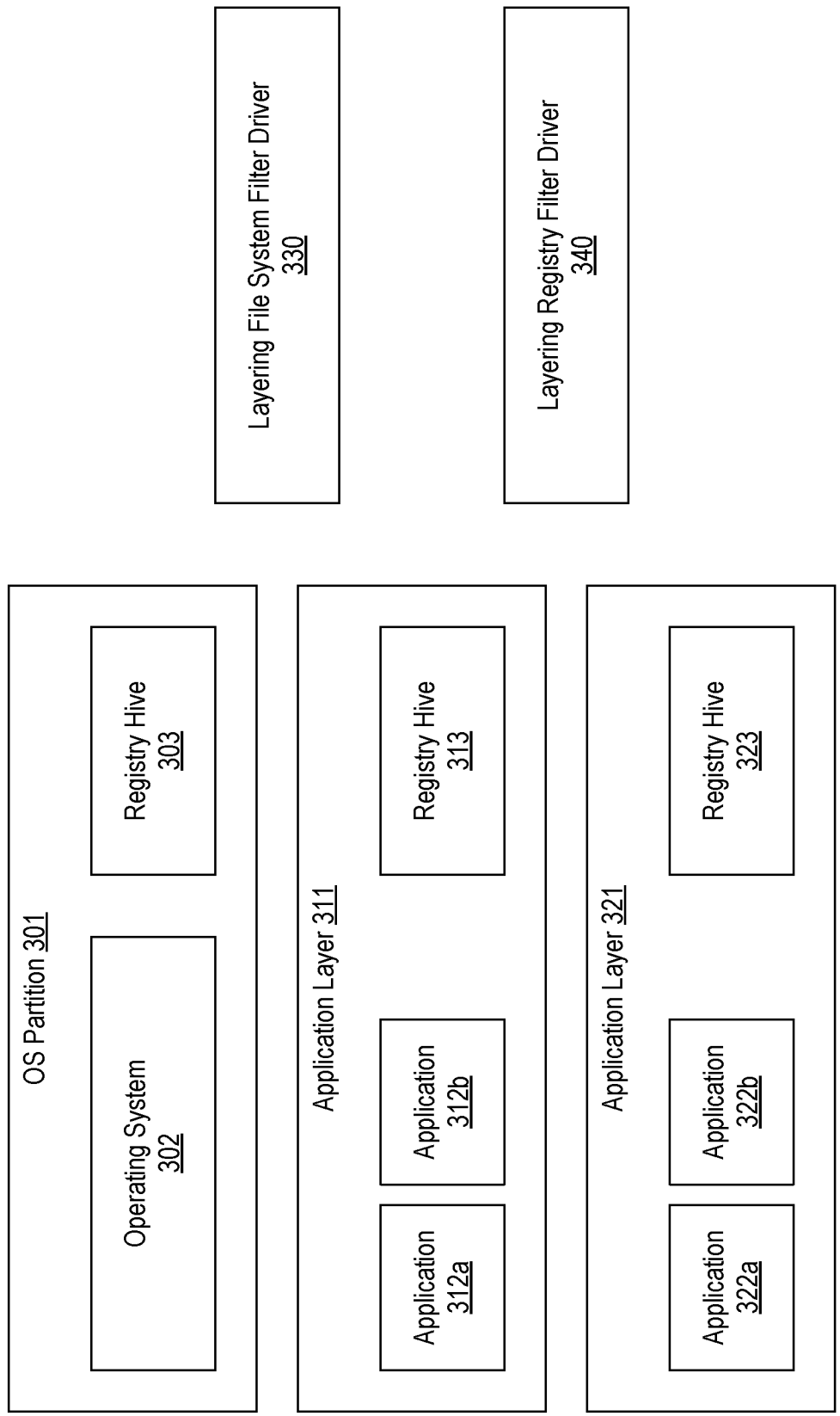
FIG. 3 illustrates how an operating system and each layer can include at least one registry hive storing configuration settings.
Figure 3A:
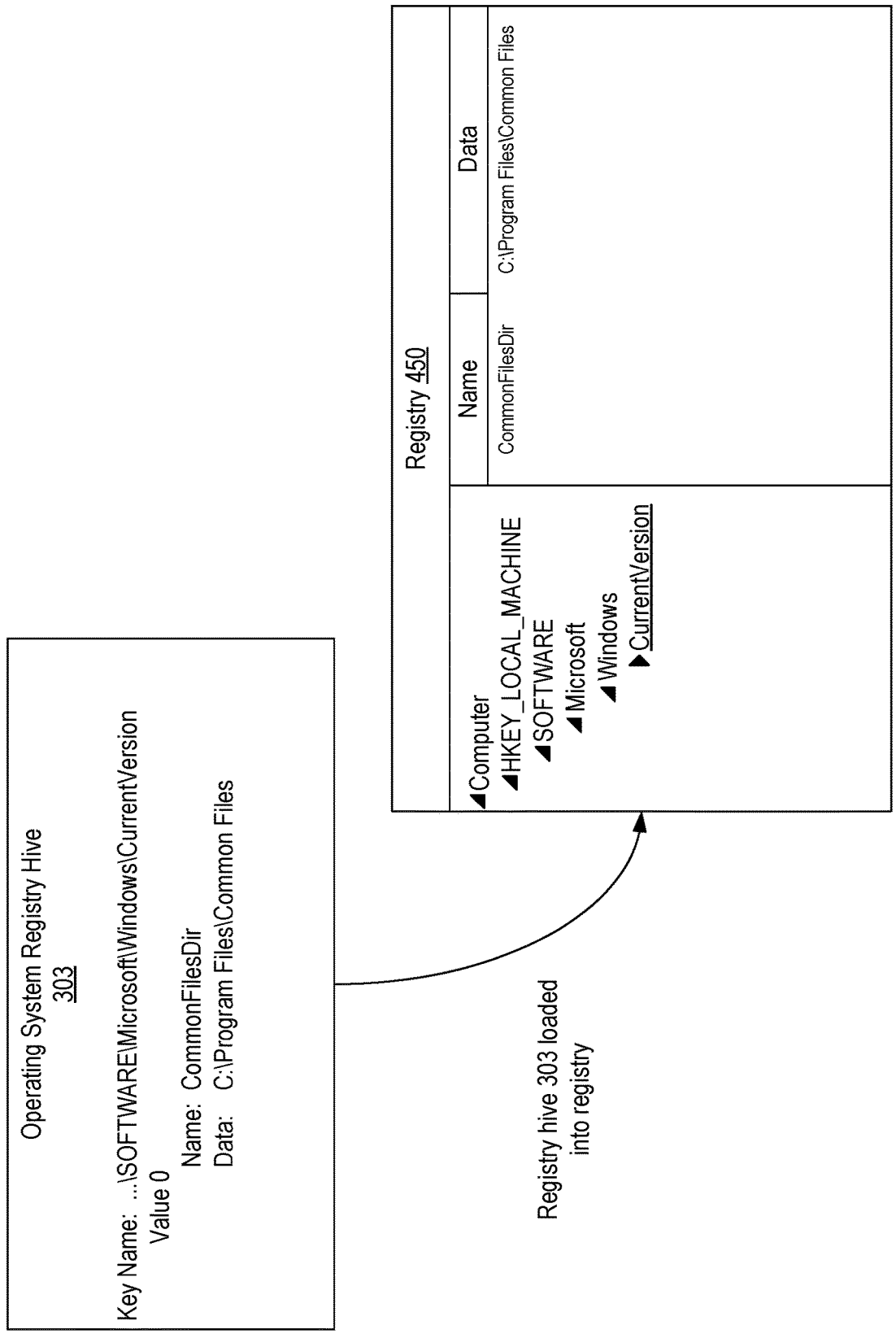
FIGS. 3A-3C illustrate how layer registry hives can be loaded into the registry.
Figure 3B:
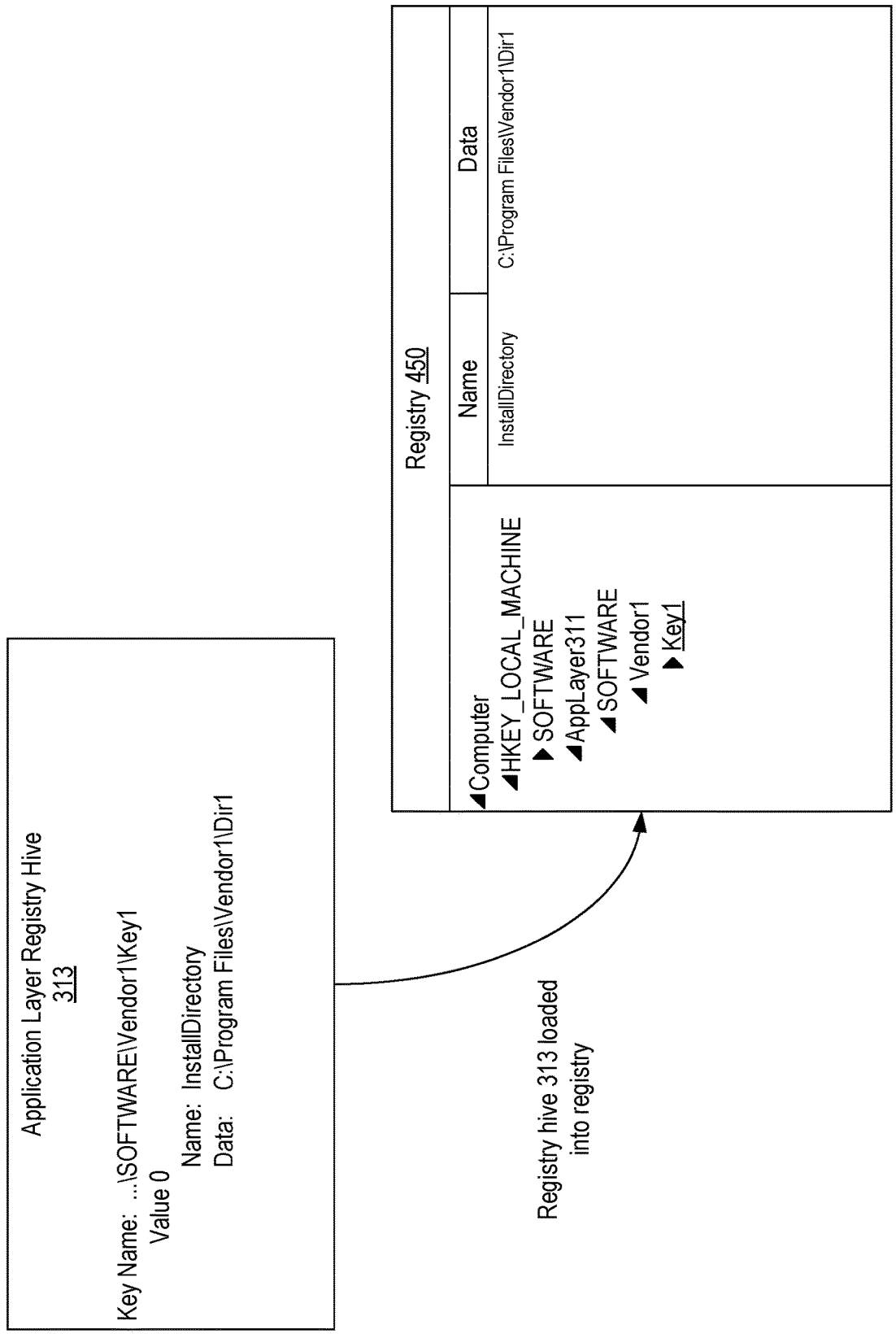
Figure 3C:
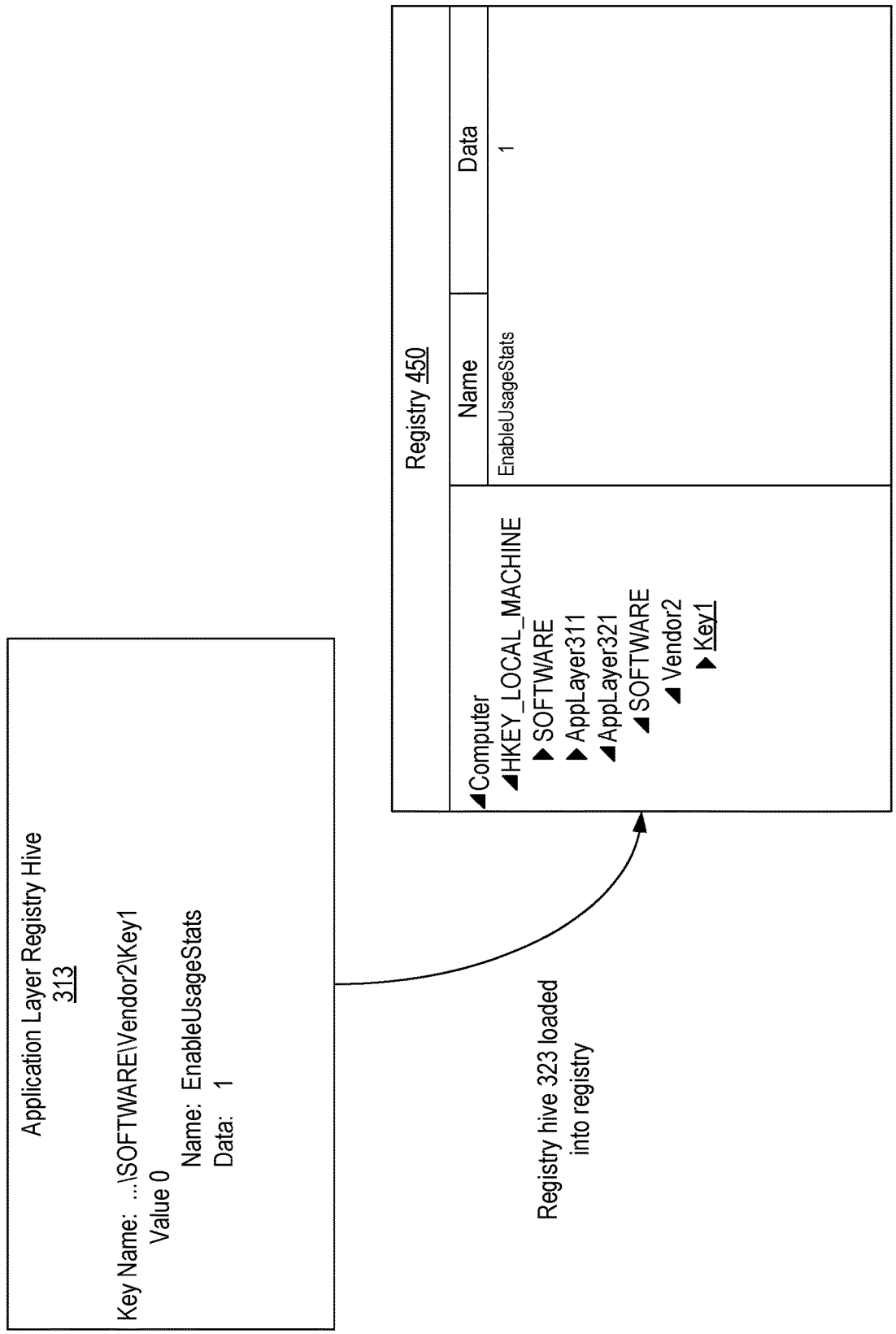
Figure 4A:
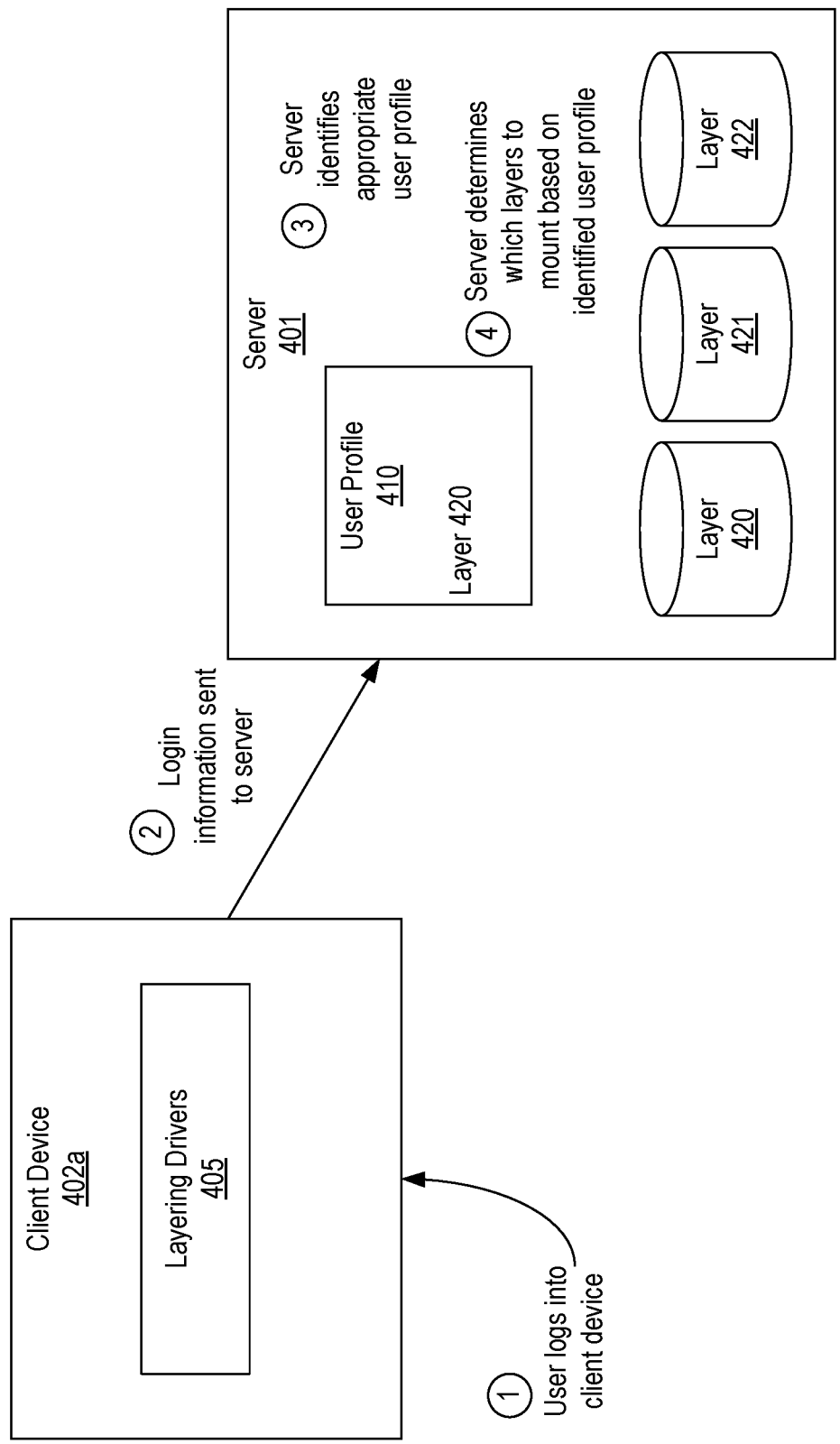
FIGS. 4A-4D illustrate how content on a layer that is mounted on a server can be accessed from a client device as if the content were stored on a partition mounted on the client device.

FIGS. 4A-4D provide a general overview of the architecture of the present invention. As shown in FIG. 4A, a server 401 can be employed to store a number of layers that can be accessed by client devices. For simplicity, server 401 is shown as storing three layers 420-422. Typically, these layers would be in the form of a VHD; however, any type of layer could be employed (e.g., a physical hard drive, a folder, a network share, etc.). Also, in typical embodiments, these depicted layers could be application layers or user data layers that include content that the user may update. For example, server 401 may store a user data layer for each potential user of a client device. However, the present invention should not be limited to a layer that includes any particular type of content. In fact, in some embodiments, a single layer can include an operating system, applications, and user data.

In typical embodiments, server 401 would manage a large number of client devices. For example, the present invention could be employed in embodiments where the client devices are thin clients. Again, for simplicity, only a single client device 402a is shown. Server 401 can store a user profile for any user that is authorized to log into any of the client devices. In FIG. 4A, a single user profile 410 is shown. User profile 410 can define, among other things, which layers should be mounted when the corresponding user logs into a client device.

Client device 402a is shown as including layering drivers 405. These layering drivers can generally represent the layering file system filter driver and layering registry filter driver that implement a layering system as described in the background. However, in accordance with the techniques of the present invention, layering drivers 405 can operate in a somewhat different manner than described in the background to allow concurrent access to user profile 410 from multiple client devices.

As represented by step 1 in FIG. 4A, a user may attempt to log into client device 402a (e.g., by providing a username and password). In response to this attempt, client device 402a can communicate the login information to server 401 in step 2. Server 401 can then employ the login information to identify an appropriate user profile in step 3. For purposes of this example, it will be assumed that the login information matches user profile 410. Therefore, in step 4, server 401 can employ user profile 410 to determine which layers should be mounted for access by the user of client device 402a. As indicated, user profile 410 identifies layer 420 thereby indicating that layer 420 should be mounted to allow its contents to be accessed on client device 402a.

Figure 4B:
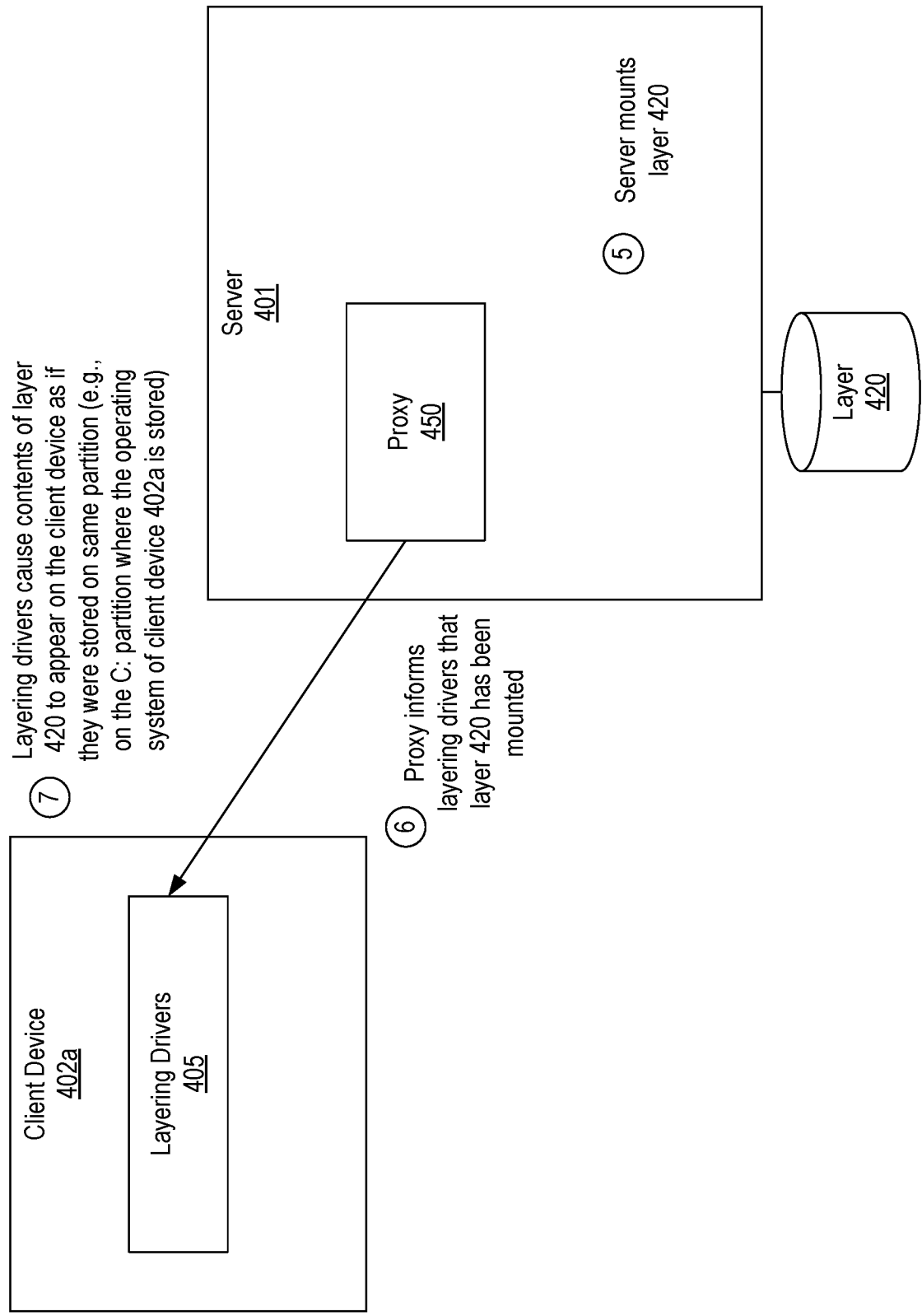

Turning to FIG. 4B, in step 5, server 401 will mount layer 420 on the server (as opposed to sending the layer to be mounted on client device 402a). For example, layer 420 could be mounted on server 401 as the D: partition. As described above, mounting a layer can include loading a registry hive on the layer into the registry at a unique location. Once layer 420 is mounted, proxy 450 could notify layering drivers 405 that layer 420 has been mounted and inform layering drivers 405 of the necessary information for mapping file system and registry requests to layer 420. For example, proxy 450 could inform layering drivers 405 that layer 420 was mounted as the D: partition (or could provide a filesystem path to the mounted partition) and that the layer's registry hive was loaded under the HKLM\Layer420 key in the registry of the server's operating system.

As represented in step 7, layering drivers 405 can access the metadata of layer 420 to provide a merged view of the layer's contents and the contents of any partition on client device 402a. For example, if client device 402a includes a disk (whether physical or virtual) with a C: partition (i.e., an operating system partition), layering drivers 405 can cause the contents of layer 420 to appear as if they were stored on the C: partition in the manner described in the background. As a result, the operating system and/or applications executing on client device 402a can generate file system requests that are directed to the C: partition but that are redirected to the D: partition on server 401. Similarly, the operating system and/or applications executing on client device 402a can generate registry requests that are directed to the client device's registry but that are redirected to the appropriate registry hive in the server's registry.

Figure 4C:
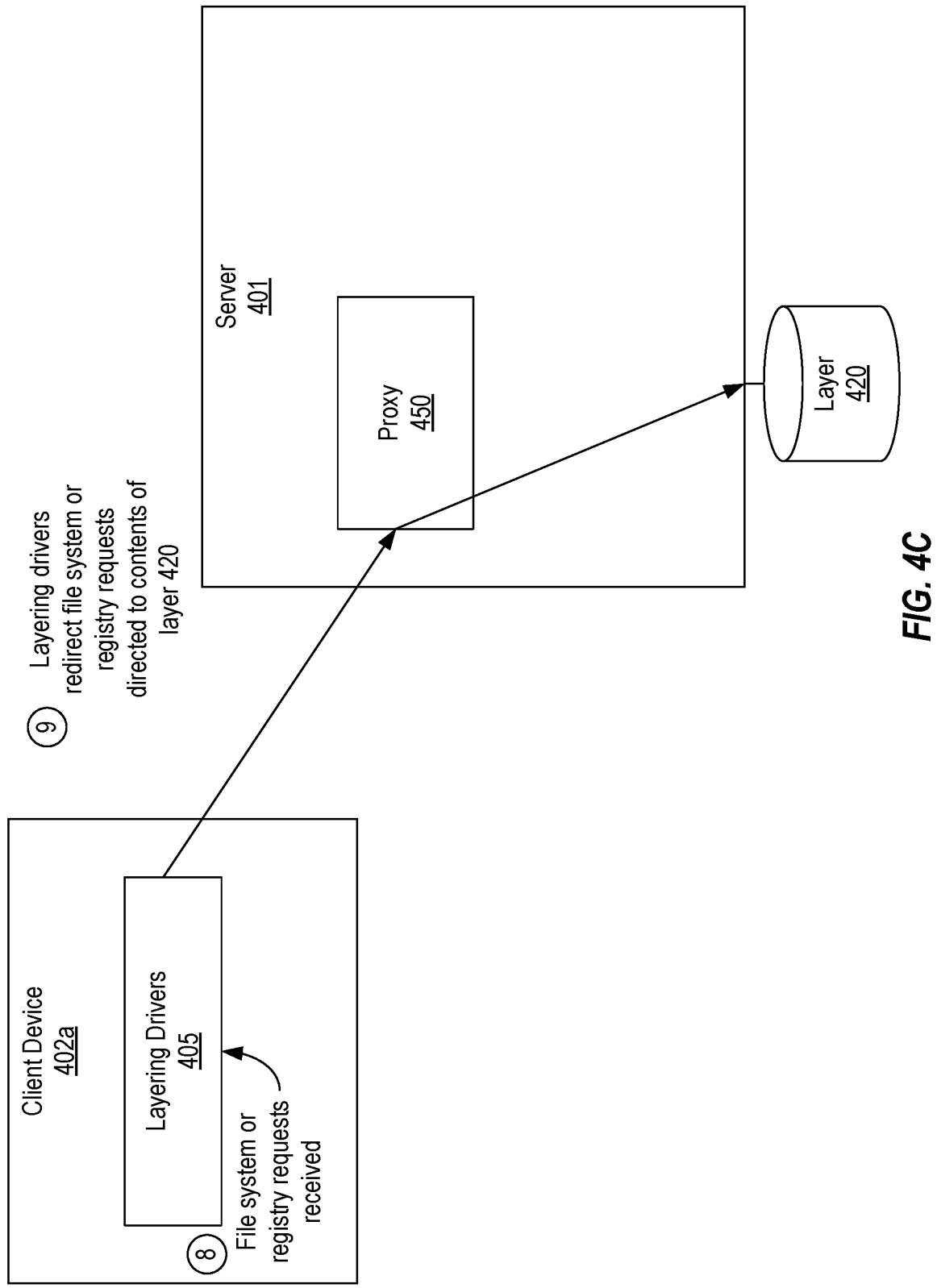

Turning to FIG. 4C, in step 8, it is assumed that file system requests pertaining to a folder or file stored on layer 420 or registry requests for a key or value in the registry hive of layer 420 is received by layering drivers 405. In a similar manner as described above, layering drivers 405 can modify such requests so that they are directed to the appropriate server partition or location in the server's registry. Once modified, these requests can be sent to proxy 450 (e.g., over a socket or virtual channel) in step 9. Proxy 450 will then route the requests appropriately (e.g., by sending file system requests to the server's file system or by sending registry requests to the configuration manager of the server's operating system).

Figure 4D:
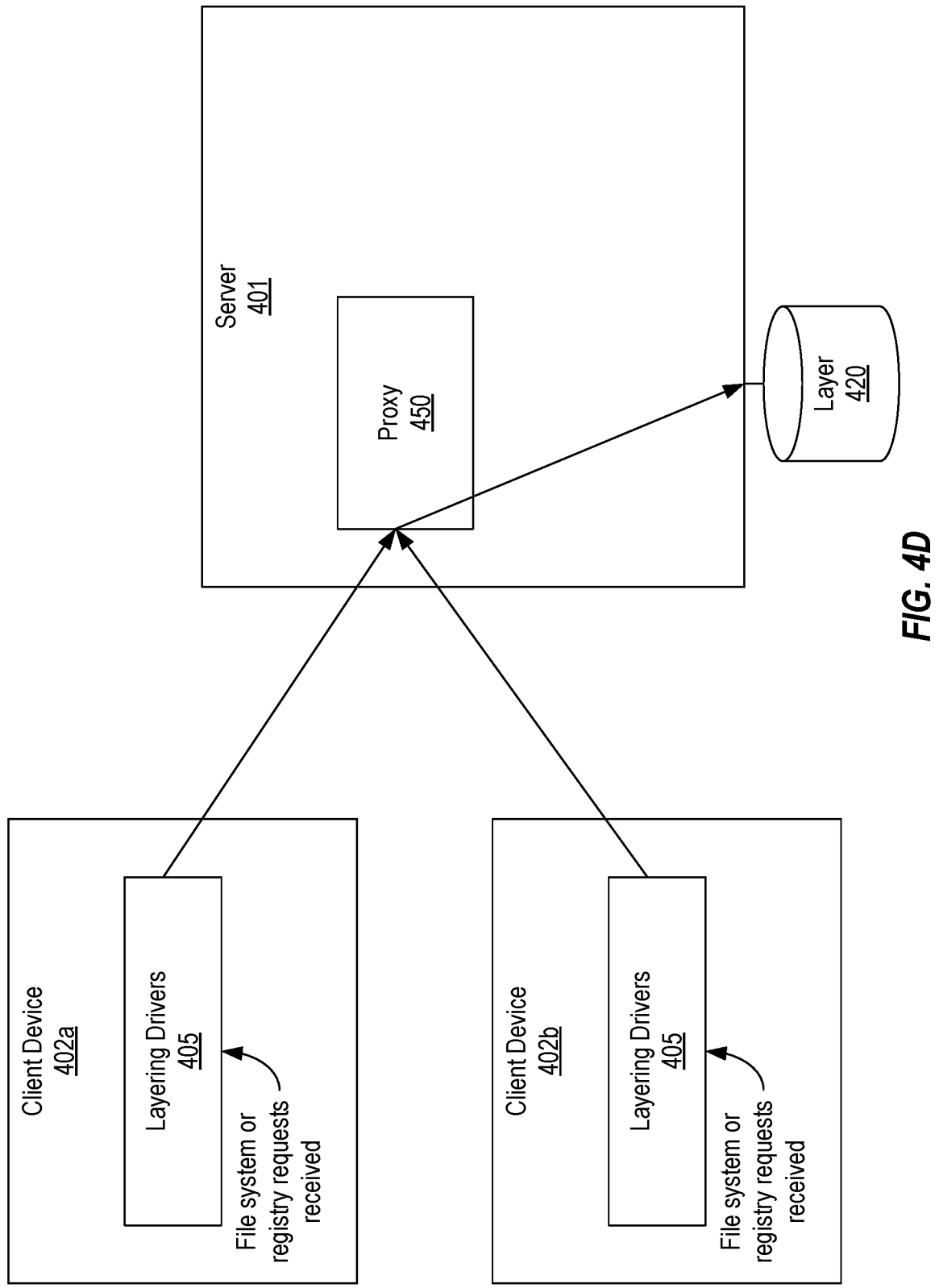

Accordingly, even though layer 420 is mounted on server 401, layering drivers 405 can abstract this fact from the higher level components on client device 402a (e.g., the OS, applications, and the user). More importantly, because layer 420 is mounted on server 401, the contents of layer 420 can be concurrently accessed from multiple client devices without the fear of data conflicts arising. For example, as shown in FIG. 4D, it is assumed that the same user has logged into client device 402*b*. As a result, the same process depicted in FIGS. 4A-4C can be performed to allow client device 402*b* to access layer 420.

Because layering drivers 405 on each of client devices 402*a* and 402*b* will route file system and registry requests to server 401, any conflict that may arise between requests could be handled in their typical fashion at server 401. In other words, once these requests are received by proxy 450, they will be viewed as if they had originated on server 401 with the components on server 401 enforcing any concurrent access restrictions. In essence, on server 401, proxy 450 will be viewed as the source of the file system and registry requests (e.g., in a similar manner as any other application that may submit file system or registry requests on server 401). Therefore, responses to such requests will be routed back to proxy 450 which in turn can route the responses to layering drivers 405.

Figure 5A:
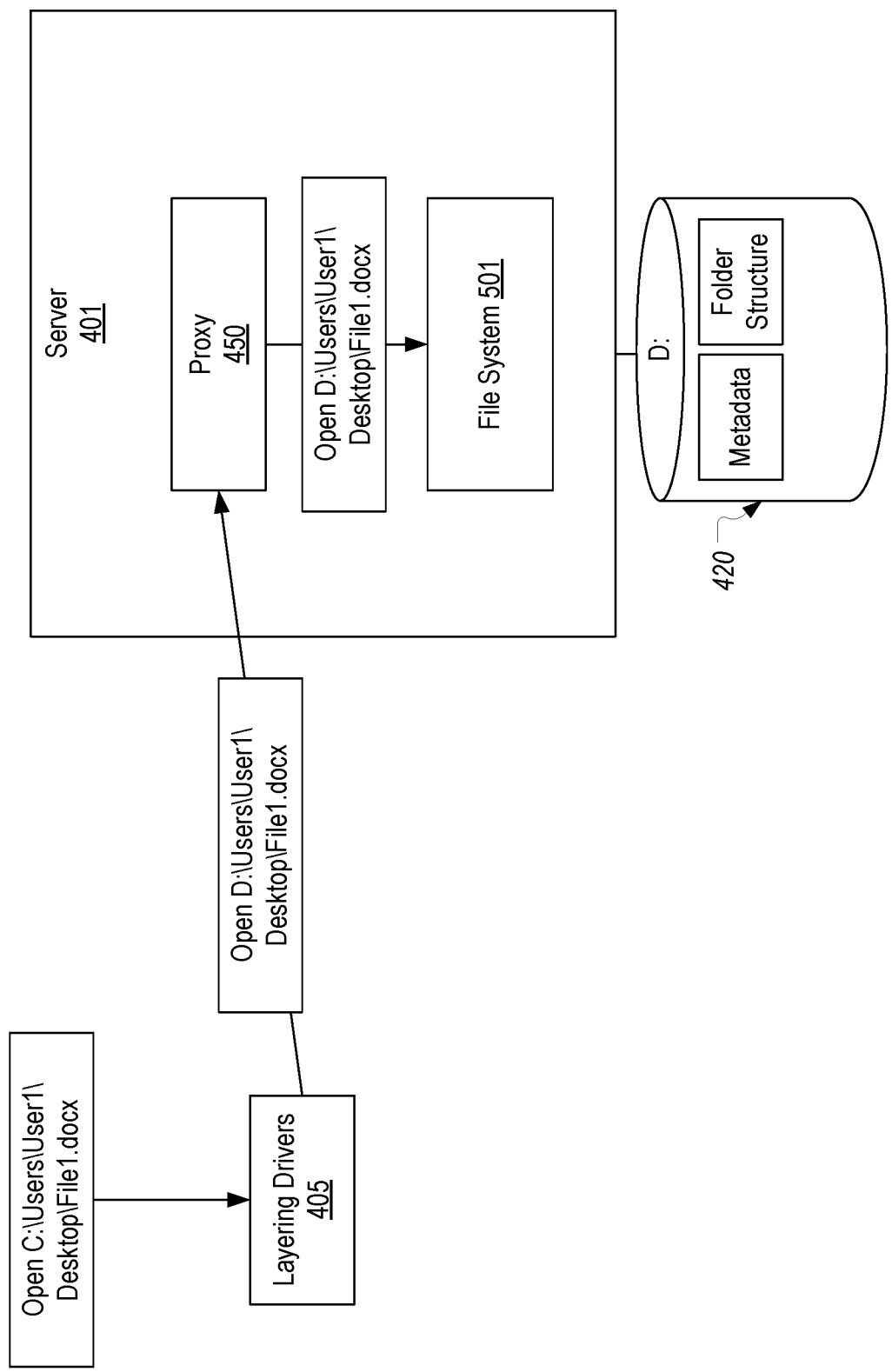
FIGS. 5A and 5B provide an example where a file stored on a server-mounted layer is accessed from the client device.
Figure 5B:
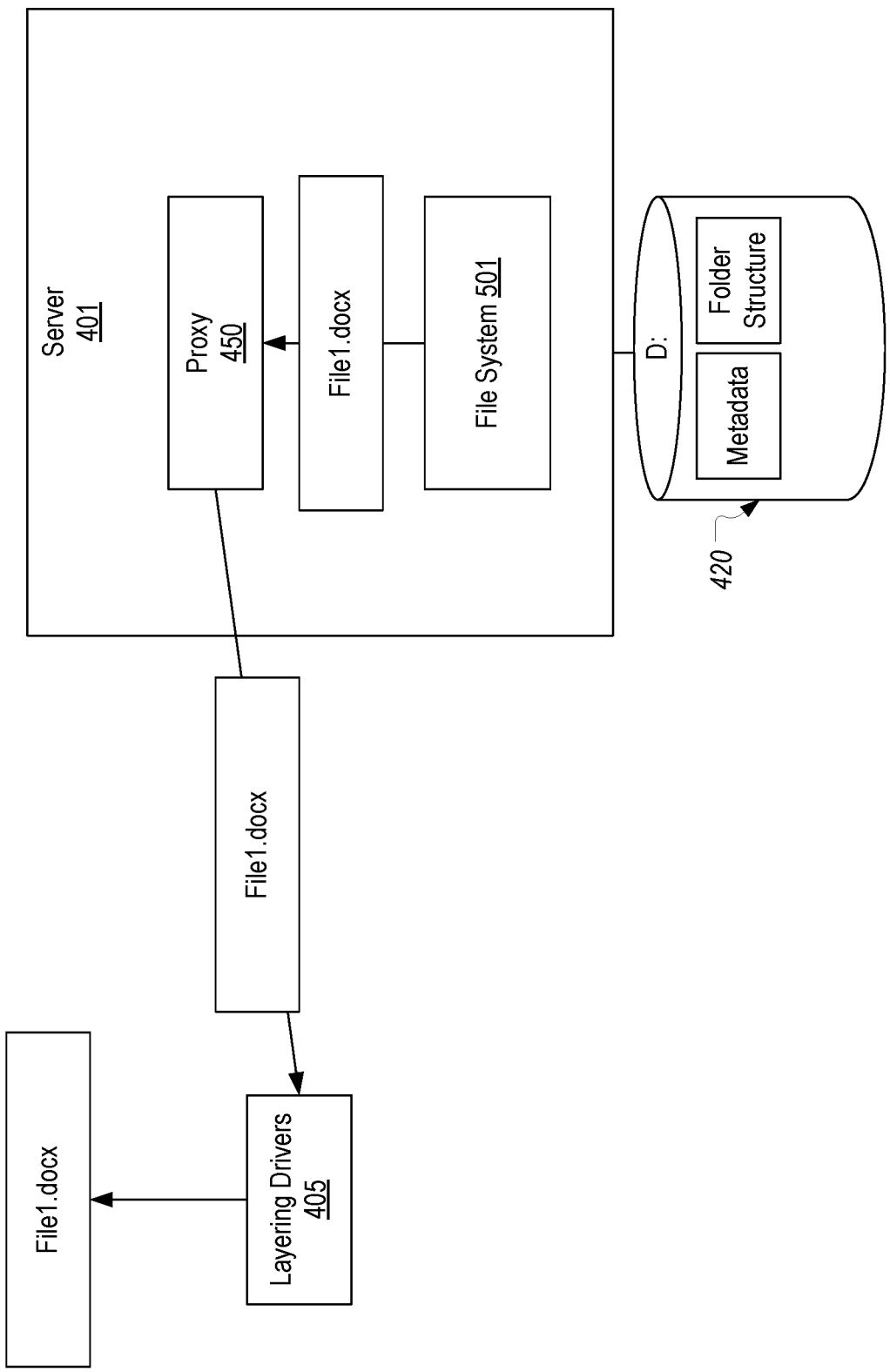

FIGS. 5A and 5B illustrate an example of how layering drivers 405 and proxy 450 can interoperate to service a file system request pertaining to layer 420. In these figures, neither of client devices 402*a* or 402*b* are shown to represent that the same processing would be performed regardless of which client device originated the file system request.

In FIG. 5A, layering drivers 405 are shown as receiving a file system request of "Open C:\Users\User1\Desktop\File1.docx." It will be assumed that the folder structure of layer 420 includes the path "Users\User1\Desktop" which would be defined in the layer's metadata. Accordingly, based on this metadata of layer 420, layering drivers 405 can determine that this open request should be modified to "Open D:\Users\User1\Desktop\File1.docx." Additionally, layering drivers 405 can determine that layer 420 is mounted on server 401 rather than on the client device. Therefore, rather than routing the modified request to the file system on the client device, layering drivers 405 can route the modified request to proxy 450 on server 401 as shown.

When proxy 450 receives this file system request, it can submit it to file system 501 on server 401 for typical handling. In particular, since layer 420 is mounted on server 401 as the D: partition, file system 501 will cause File1.docx to be opened as represented in FIG. 5B. As mentioned above, File1.docx will be routed back to proxy 450 which can determine that the file should be routed back to layering drivers 405 on the corresponding client device. Layering drivers 405 can then complete the open request by returning File1.docx to the requesting application on the client device.

Figure 6A:
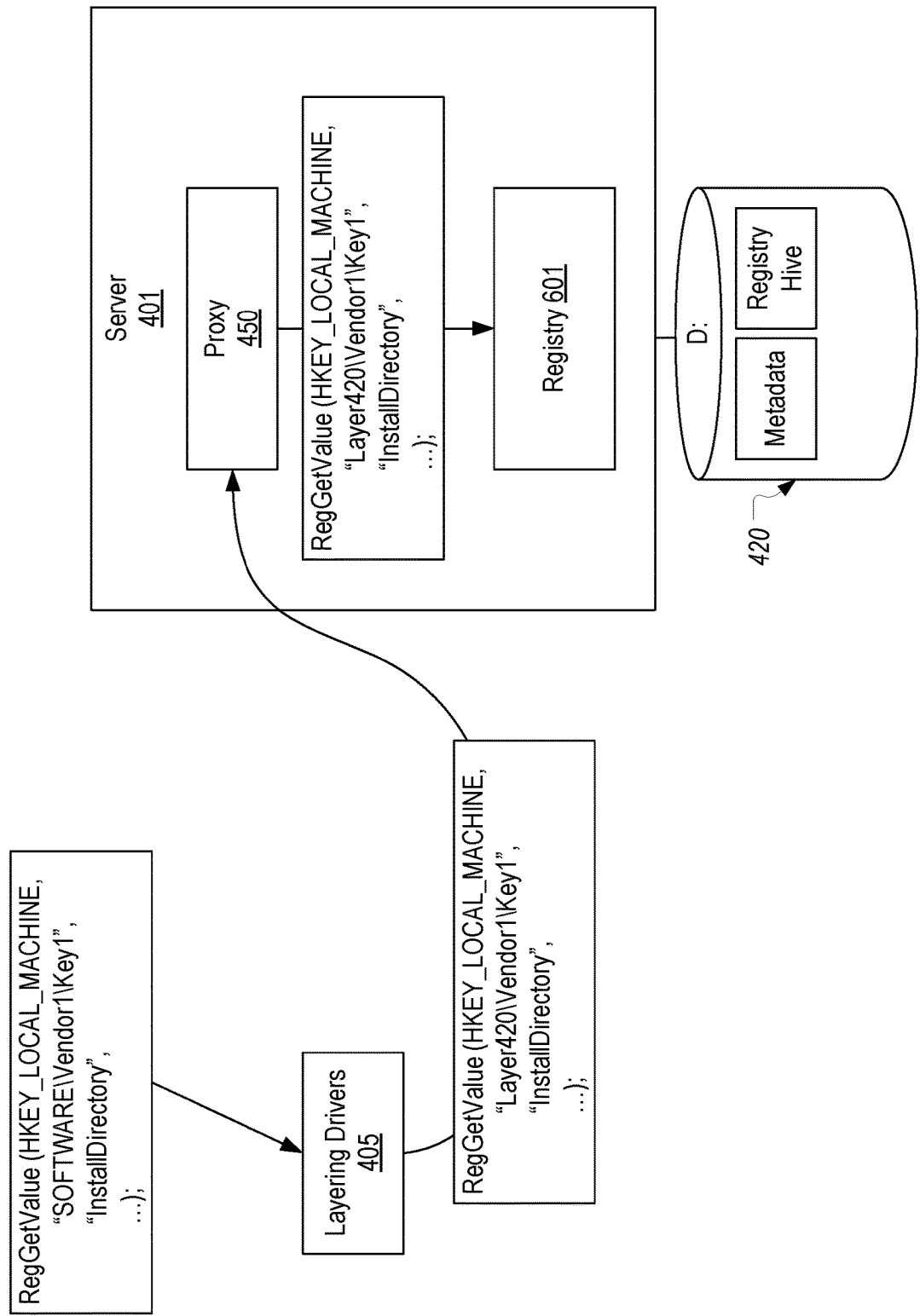
FIGS. 6A and 6B provide an example where registry data in a registry hive loaded in the server's registry is accessed from the client device.
Figure 6B:
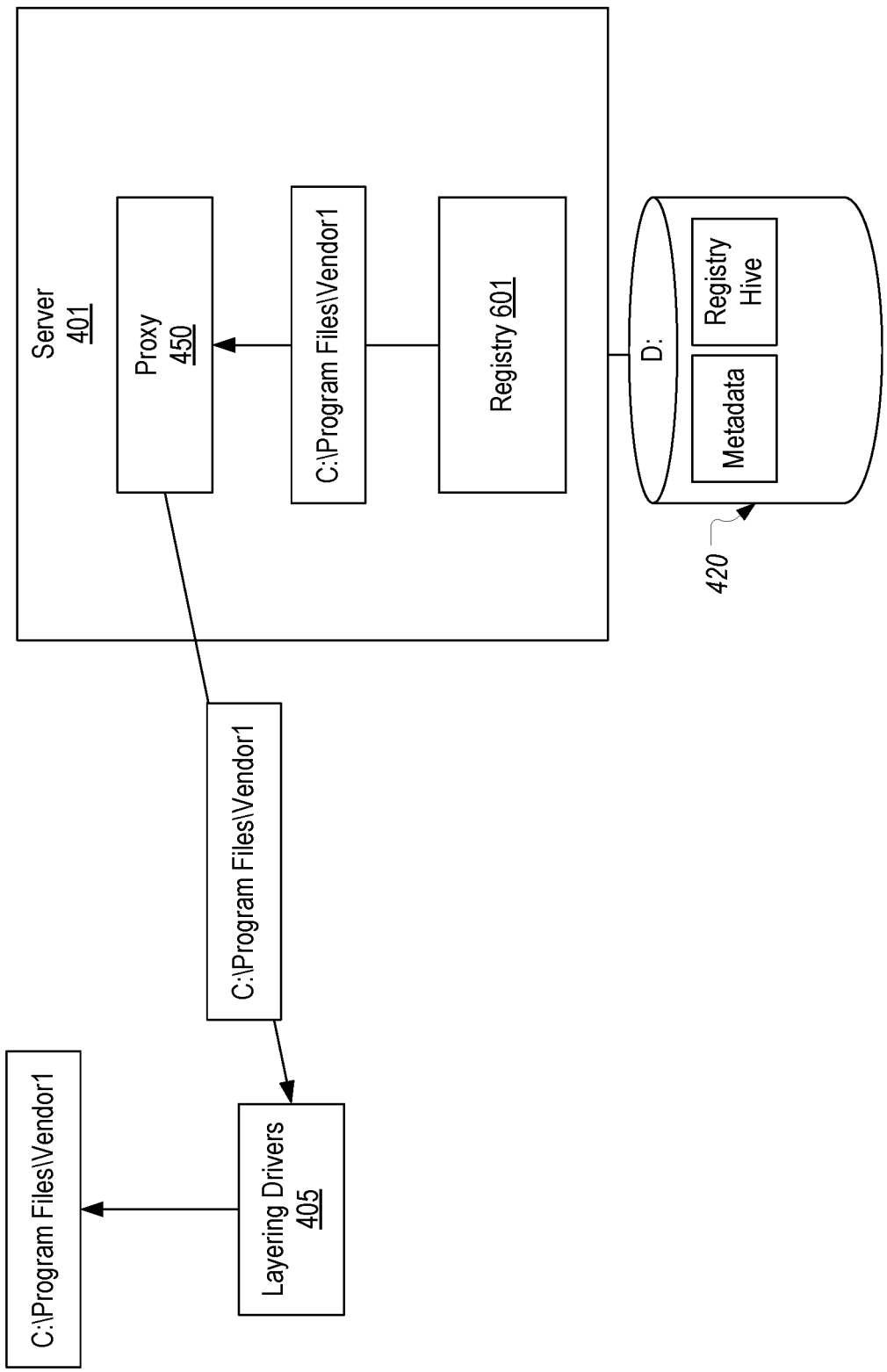

FIGS. 6A and 6B illustrate that a similar process can be performed when a registry request is received. In FIG. 6A, it is assumed that a "RegGetValue" request is received at layering drivers 405. This RegGetValue request identifies a registry key at "HKEY_LOCAL_MACHINE\SOFTWARE\Vendor1\Key1" and requests the data of the value "InstallDirectory." Based on layer 420's metadata, layering drivers 405 can determine that the Vendor1\Key1 key is part of layer 420's registry hive. Therefore, layering drivers 405 can modify the registry request so that it is directed to "HKEY_LOCAL_MACHINE\Layer420\Vendor1\Key1." Layering drivers 405 can also determine that layer 420 is mounted on server 401 and can therefore route the modified request to proxy 450. Proxy 450 will then provide the modified registry request to registry 601 (e.g., via the configuration manager).

Turning to FIG. 6B, registry 601 will be accessed to obtain the data of the InstallDirectory value (which is assumed to be "C:\Program Files\Vendor1"). The data will be returned to proxy 450. Proxy 450 can determine that the data should be routed back to layering drivers 405 which will then return the data to the requesting application on the client device.

As can be seen, if layer 420 is concurrently provided to multiple client devices (e.g., if the same user logs into multiple client devices at the same time), the contents of layer 420 can be concurrently accessed without the fear of data conflicts. If, by chance, multiple client devices attempted to access the same content at the same time, the typical access restrictions would be implemented at server 401 to prevent conflicts from occurring. For example, if an application on client device 402*a* opens File1.docx and then an application on client device 402*b* attempts to open File1.docx, server 401's typical access management components could limit the application on client device 402*b* to read-only access in a similar way as if the two applications were both executing on server 401.

However, when the client devices employ the Windows operating system, there may be additional difficulty with this approach. In particular, many versions of Windows employ an in memory file system for caching copies of files that have been read from the disk. In the context of the present invention, if the client device reads a file from layer 420, the file will be cached in the memory of the client device. Then, if the client device updates the file, the update will be performed on the cached version of the file in the client device's memory rather than directly to the file stored on layer 420.

Due to this file system cache, data conflicts could potentially arise in some situations. For example, if both client devices 402*a* and 402*b* opened File1.docx, server 401 would typically allow this to happen since it is a read operation that would not result in data conflicts. However, this opening of File1.docx would result in the file being cached on each of the client devices. If either of the client devices updates the file, the updates would initially be made to the cached copy and later committed to layer 420. This can result in inconsistencies.

To address this problem, the present invention can employ a device view. A device view is a device-specific caching component that can reside on either the client device or the server. The device view can provide a view of all the files on a layer as seen by the particular client device. The device view could function in conjunction with typical file system cache techniques and can be employed to prevent data conflicts from arising when a layer is mounted on the server and concurrently accessed from multiple client devices.

As an overview, a device view can be positioned as an intermediary between layering drivers 405 and proxy 450 (or possibly as part of proxy 450). The device view can be configured to evaluate file system requests that it receives from layering drivers 405 to determine whether the request is directed to a file that is opened by another client device. If the file is not opened by any other client device, the device view can allow the request to be routed to proxy 450 for processing in the manner described above. However, if the file is opened by one or more other client devices, the device view can process the request using a copy of the file that is cached in the device view. In other words, when a file in concurrently opened by multiple client devices, the device view on each client device can maintain a copy of the file to which any read or write request will be directed. In this way, each client device can maintain its own view of the file while the file is opened by multiple client devices.

If the copy of the file in multiple device views is modified, a policy can be applied to determine which modifications will be propagated back to the original copy on the layer. For example, the device view may be configured to store a timestamp defining when the modifications were made, and the layering system may be configured to retain the most recent modifications. Various examples of how device views can function are provided below.

FIGS. 7A-7C and 8A-8C illustrate how device views can be employed. Although these figures only depict client devices 402a and 402b and layer 420 for simplicity, it is to be understood that each of the components described above would be present and functioning in the manner described above. In some embodiments, a device view may be maintained on a client device any time a server-mounted layer is made available to a client device. In such cases, the device view may remain empty until the client device opens a file that is also opened by another client device. In other embodiments, a device view may not be created until the client device opens a file that is also opened by another client device. In any case, once multiple client devices open the same file on the server-mounted layer, each client device's device view will cache of copy of the file so that any read or write operations to that file can be redirected to the cached copy in the device view rather than to the original file on the layer.

Figure 7A:
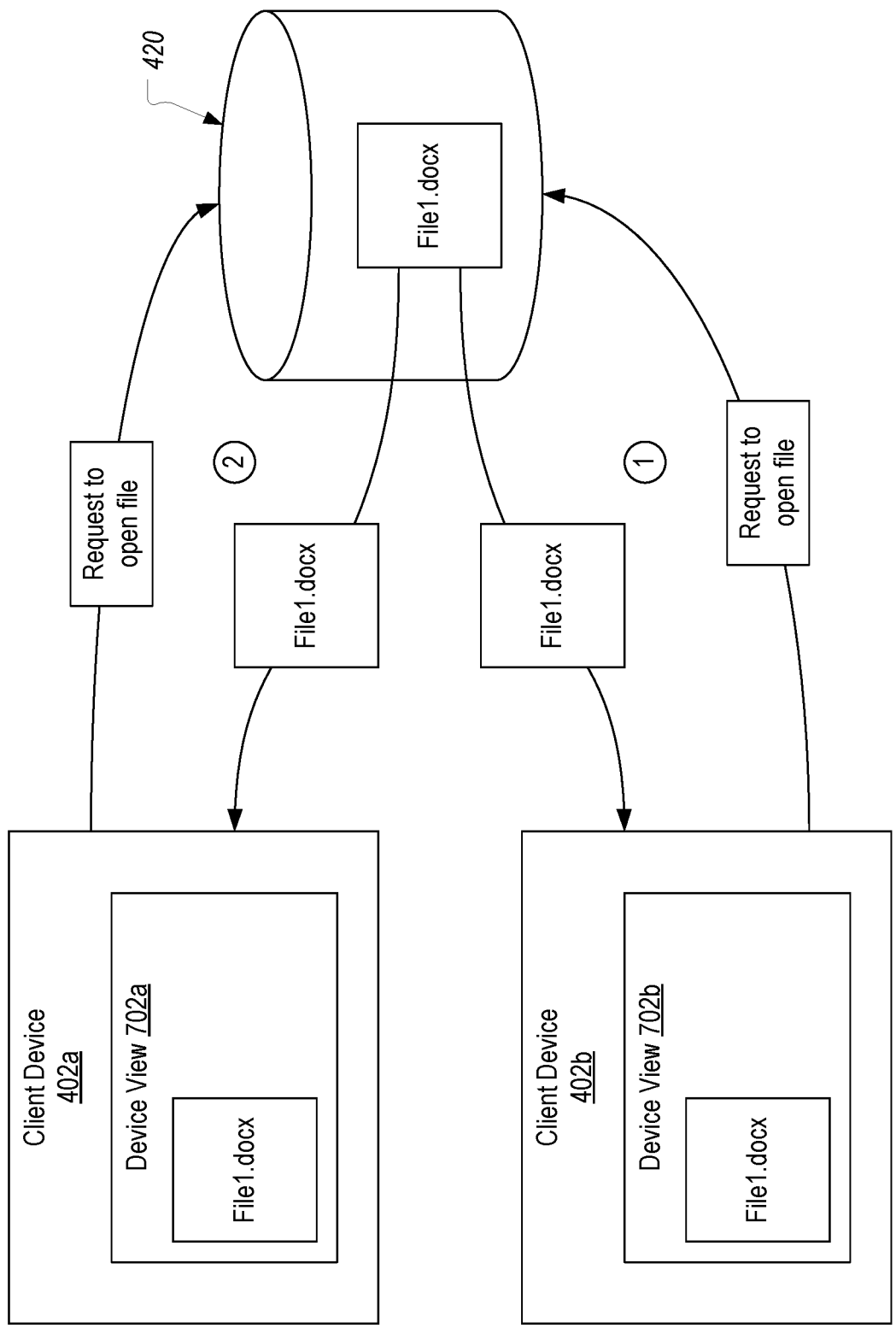
FIGS. 7A-7C illustrate a first example of how a device view can be employed.
Figure 7B:
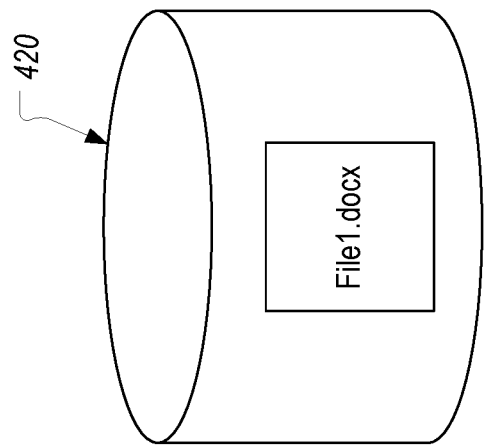
Figure 7B:
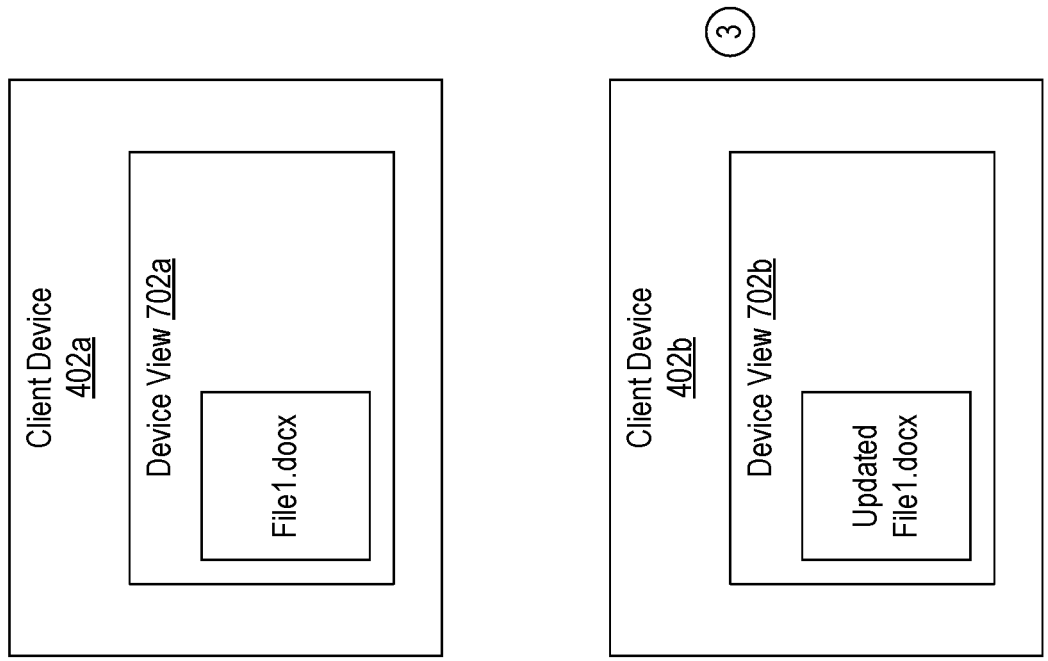
Figure 7C:
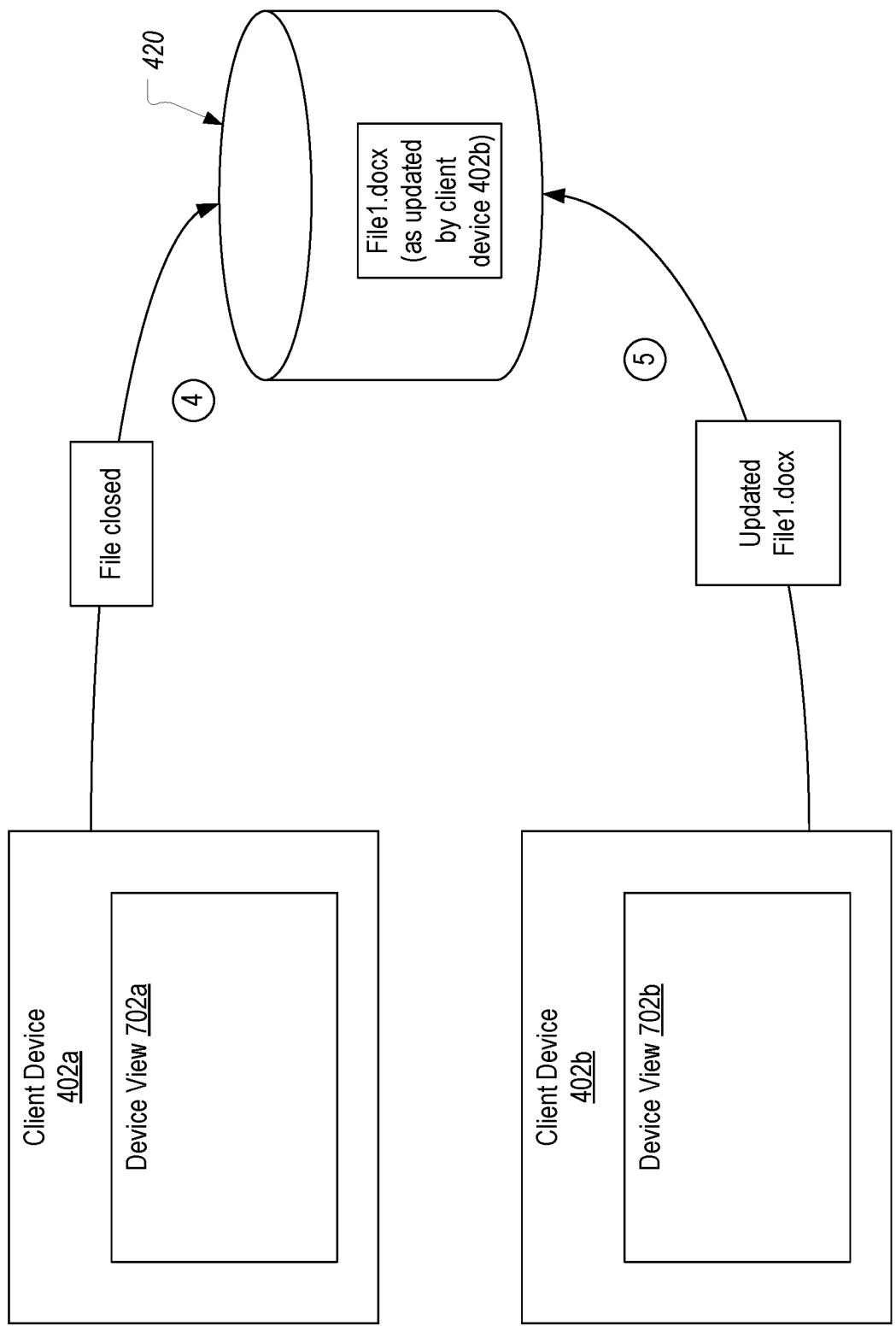

FIGS. 7A-7C represent one possible scenario where device views can be used to prevent inconsistencies. In FIG. 7A, client device 402b is shown as opening File1.docx which is stored on layer 420. It will be assumed that client device 402b opens File1.docx before client device 402a opens the file. Therefore, initially, device view 702b will remain empty. Then, while client device 402b still has File1.docx opened, client device 402a requests to open the file. Because client device 402b also has File1.docx opened, device views 702a and 702b can each be updated to store a copy of File1.docx on client devices 402a and 402b respectively. Although not shown, proxy 450 could detect that File1.docx is open on client device 402b when client device 402a requests to open the same file. In response, proxy 450 could inform device views 702a and 702b on each of client devices 402a and 402b to cache a copy of File1.docx. Accordingly, FIG. 7A illustrates that File1.docx is cached in device views 702a and 702b.

Turning to FIG. 7B, it is assumed that client device 402b modifies File1.docx. In accordance with embodiments of the present invention, layering drivers 405 will route the corresponding write request(s) towards proxy 450 via device view 702b. Device view 702b can then determine whether File1.docx is opened by any other client devices. Because File1.docx is opened on client device 402a, device view 702b will direct the write request(s) to the cached copy of File1.docx in device view 702b thereby creating an updated version of File1.docx as represented by step 3.

It is noted that this updating of File1.docx in device view 702b can be performed in conjunction with normal file system cache techniques. For example, when the operating system initiates paging I/O to write the modifications that are stored in the file system cache to disk, layering drivers 405 would intercept these paging I/Os and redirect them towards proxy 450 via device view 702b. While client device 402b is modifying File1.docx, it is assumed that client device 402a is not making any modifications. Therefore, device view 702a only contains the cached copy of File1.docx without any modifications.

FIG. 7C then depicts that client device 402a closes File1.docx without having modified it. For purposes of this example, it will be assumed that client device 402a closes the file while client device 402b still has the file open. However, in this example, the end result would be the same regardless of the order in which the client devices close the file. Because client device 402a did not modify File1.docx, the modifications made by client device 402b can be committed to layer 420. For example, when client device 402a closes the file, proxy 450 could notify device view 702b that all outstanding handles to the file have been closed. In response, device view 702b can send the updated file to layer 420 for merging into the copy of the file stored thereon. Additionally, device view 702b could discard the cached copy of File1.docx.

Alternatively, if client device 402b had closed File1.docx before client device 402a, device view 702b instead could have retained the updated File1.docx until it was notified that no open handles to the file exist. Once all handles to the file were closed (of which proxy 450 could notify device view 702b), device view 702b could then send the updated file to proxy 450 for merging to layer 420.

Figure 8A:
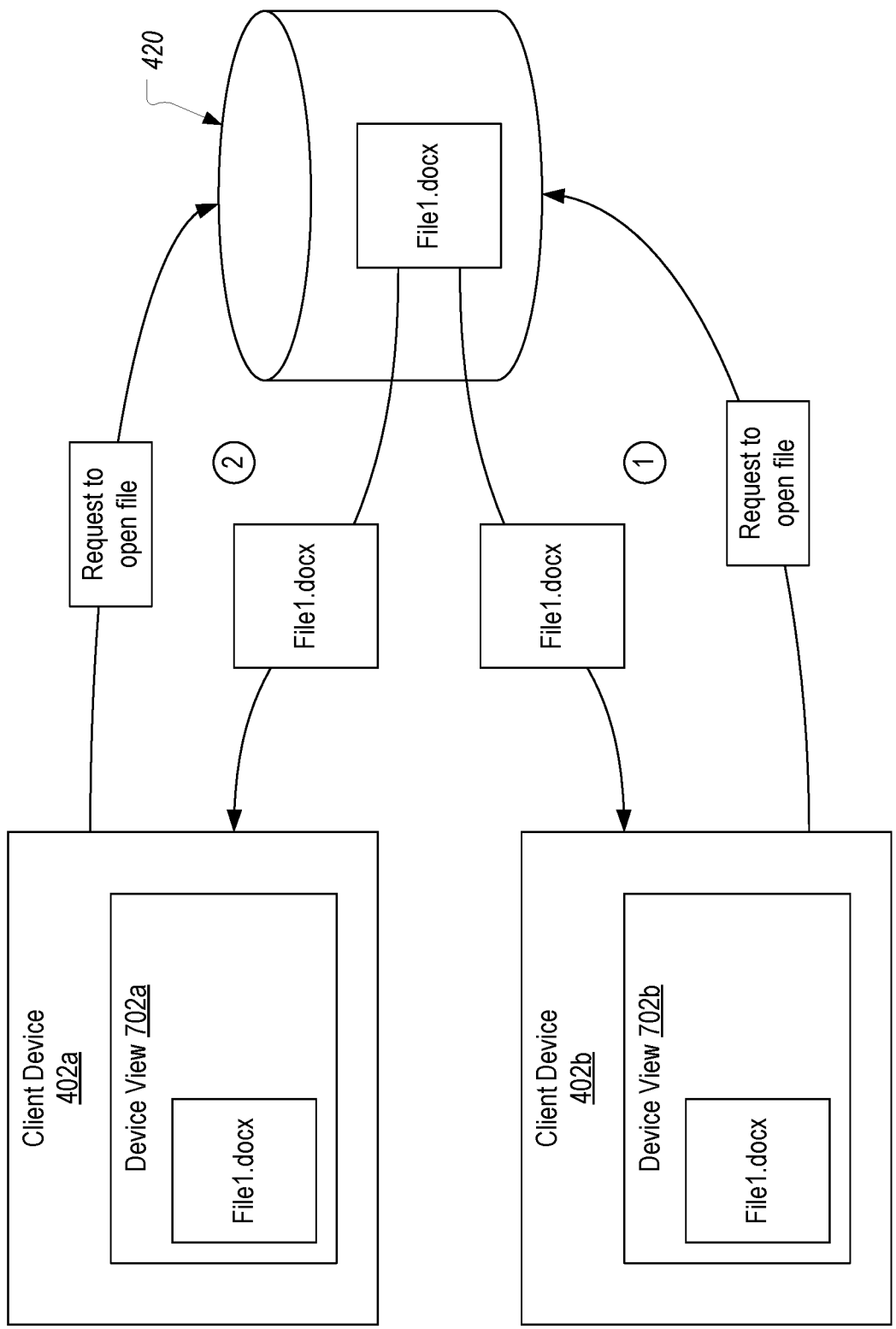
FIGS. 8A-8C illustrate a second example of how a device view can be employed.
Figure 8B:
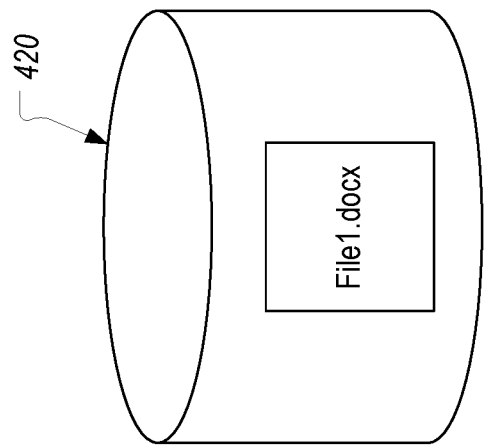
Figure 8B:
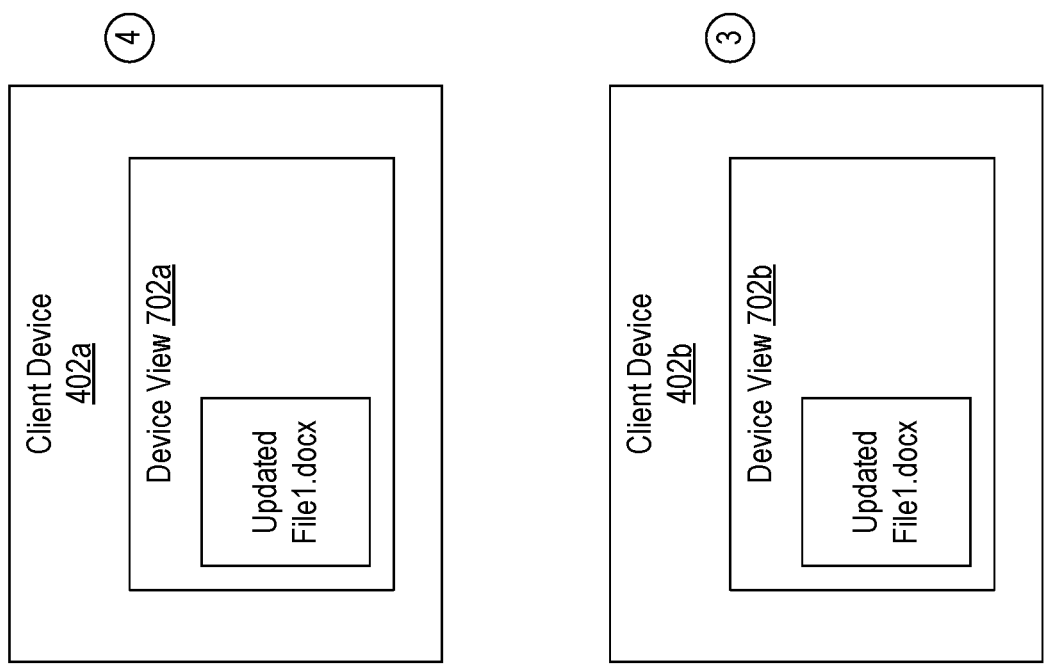
Figure 8C:
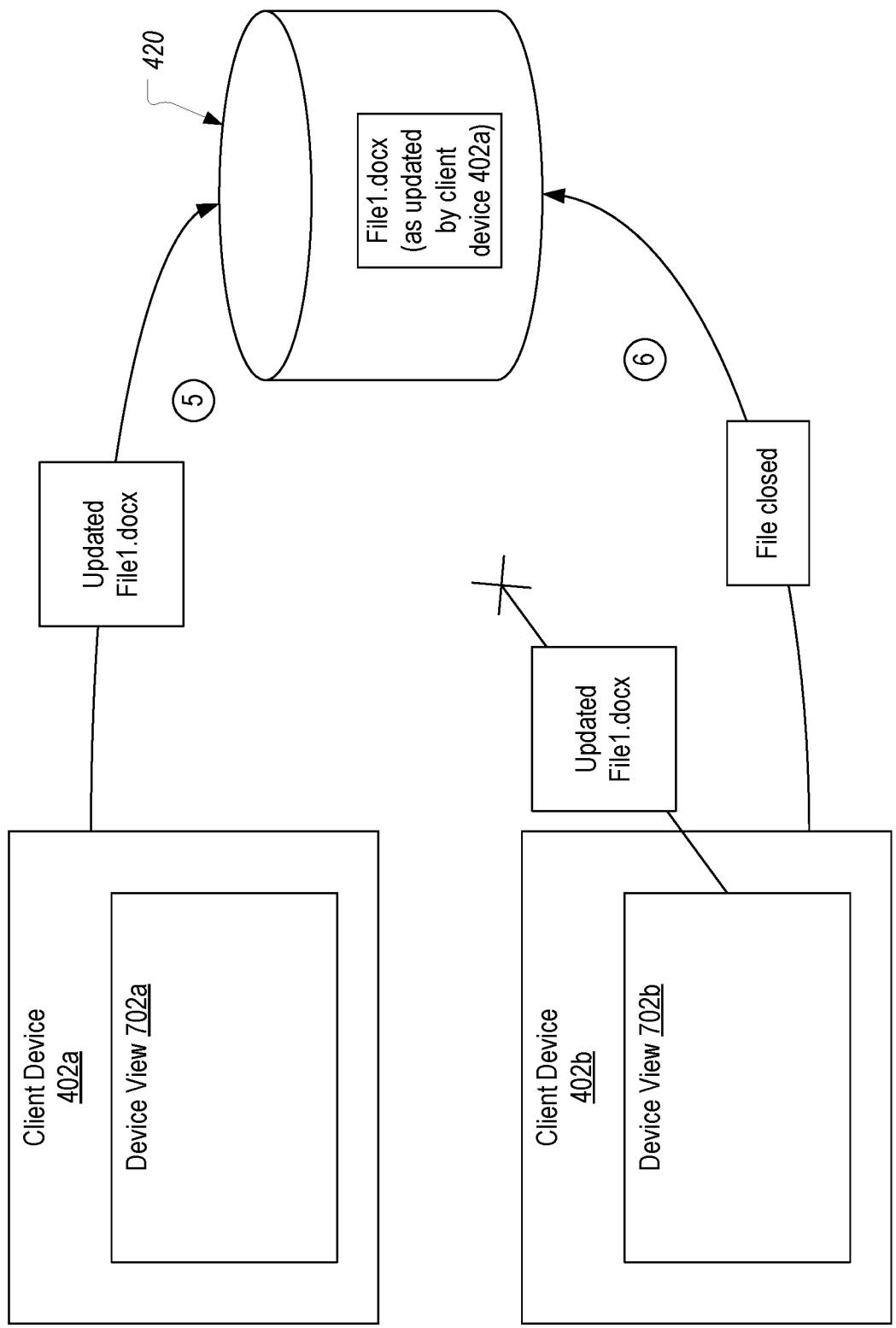

FIGS. 8A-8C provide another example of how device views can be employed. As with FIG. 7A, FIG. 8A depicts that both client devices 402a and 402b open File1.docx resulting in a copy of the file being cached in the respective device views in steps 1 and 2. Then, FIG. 8B represents that both client device 402a and client device 402b modify File1.docx resulting in the respective modifications being cached in device views 702a and 702b in steps 3 and 4. As mentioned above, when either of client devices 402a and 402b closes File1.docx, proxy 450 can inform the corresponding device view that the file is still opened by another client device therefore causing the updated file in that device view to be maintained. Then, once the other client device closes the file, the applicable policy can be employed to determine which modifications should be merged to layer 420. In this example, it will be assumed that the modifications made by client device 402a will be retained as indicated in step 5. On the other hand, the modifications made by client device 402b will be discarded as represented in step 6.

FIG. 8C exemplifies another drawback to allowing concurrent access to the same layer, namely, that updates made on one client device may be permanently lost if updates to the same file are concurrently made on another client device. In some embodiments, the present invention can be configured to address this drawback as is represented in FIG. 9.

Figure 9:
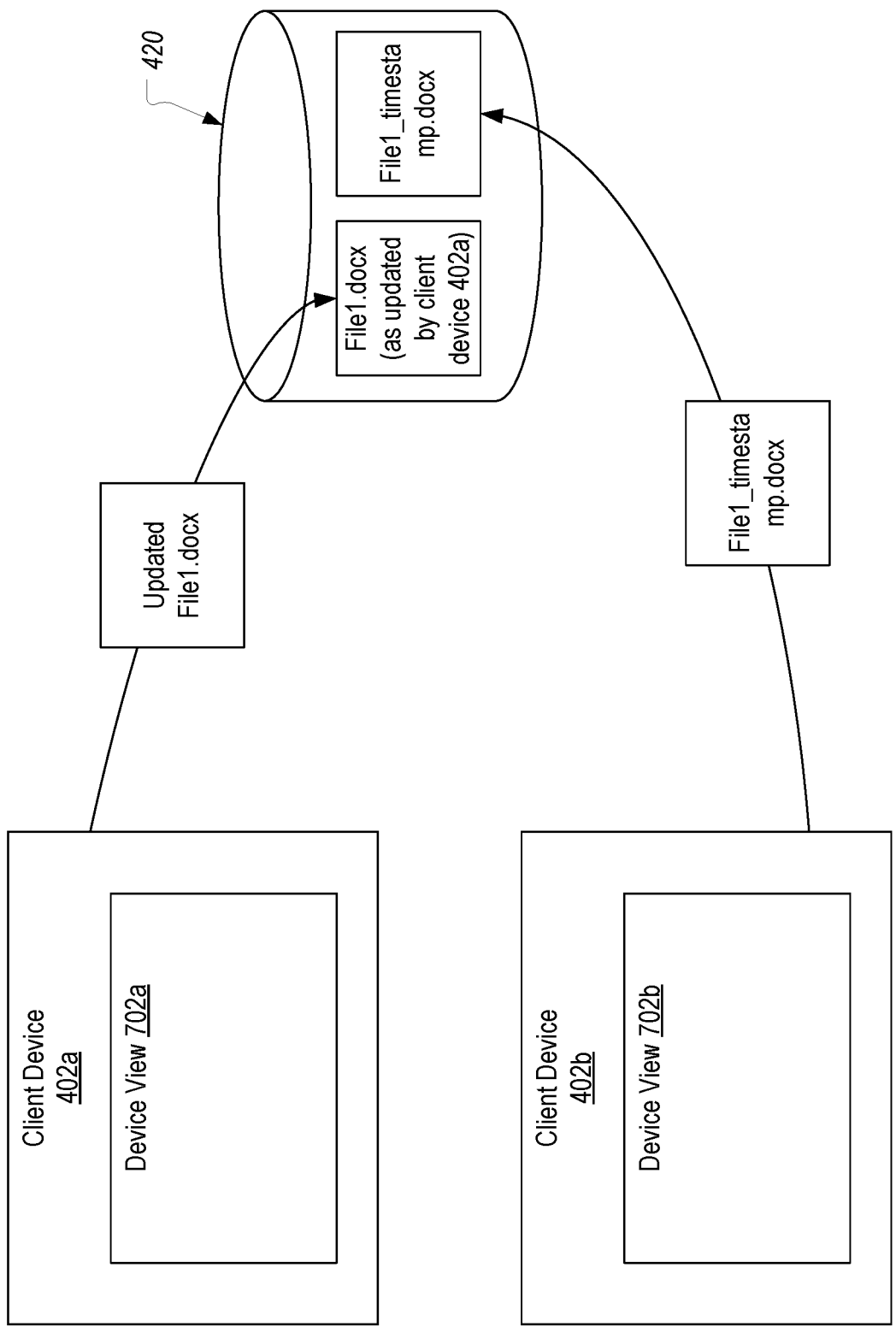
FIG. 9 illustrates how a device view can allow a user's modifications to a file to be maintained even when a conflict has caused the modifications to not be persisted to the original file on the layer.

FIG. 9 is intended to represent the same scenario depicted in FIGS. 8A-8C. In particular, in FIG. 9, both client devices 402a and 402b have concurrently updated File1.docx with these updates residing in their respective device views. Once both client devices have closed the file and the applicable policy has been applied to determine that client device 402a's modifications should be persisted to the copy of the file on layer 420, the copy of the file stored in device view 702b can be renamed to include a timestamp (or otherwise modified to include an identifier that the file is a modified copy of File1.docx that was not persisted to the original copy). The timestamp can identify when the file was modified. In some embodiments, an additional identifier of the client device on which the modifications were made may also be added to filename (e.g., File1_04_28_2016_13:35_Computer1234.docx). This copy can then be stored on layer 420 alongside the actual File1.docx. As a result, the user will still be able to access any modifications that may have been made to the file during a concurrent access situation even if the modifications were not persisted to the original file on the layer.

Figure 10:
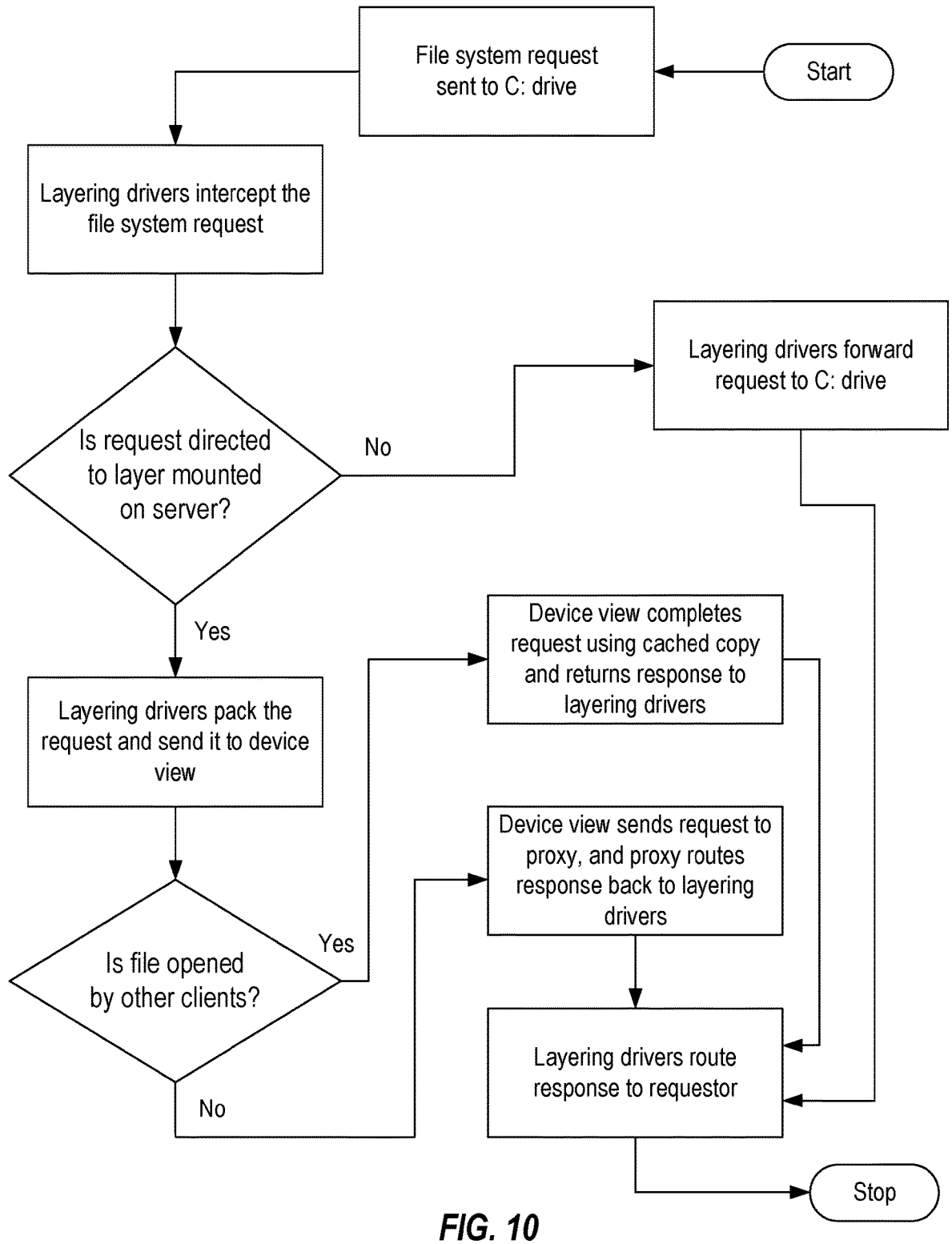
FIG. 10 illustrates a flow diagram of a process for allowing a file on a layer to be concurrently accessed.

FIG. 10 provides a flow diagram depicting the general process that can be performed when a client device accesses a file that is stored on a layer that is mounted on a server. In this flow diagram, it will be assumed that the layering drivers cause the contents of the server-mounted layer to appear as if they were stored on the C: drive and that an actual C: drive is mounted on the client device (e.g., in the form of a physical or virtual drive).

In a first step, file system requests that are directed to the C: drive are sent towards the file system. The layering drivers can intercept these file system requests and determine whether they are directed to the actual C: drive or to a server-mounted layer. If the requests are directed to the actual C: drive, the layering drivers can simply pass the requests on towards the C: drive for normal processing. In contrast, if the requests are directed to a server-mounted layer, the layering drivers can modify the request (e.g., by changing the drive letter to D or converting the drive letter to a file system path) and package the request in an appropriate format for transmission over a network. The modified/packaged request can then be provided to the device view which will determine whether the target file is open on another client device (e.g., by querying the proxy on the server). If the target file is not open on any other client device, the packaged request can be sent over the network to the proxy which will submit the request to the server's file system and return any response. In contrast, if the file is opened on another client device, the device view can obtain a copy of the file (if one has not already been cached in the device view), complete the request against the cached copy (e.g., by writing updates to the cached copy in the device view or by opening the cached copy which may or may not include modifications that were previously made by the client device), and return any response. The layering drivers can then route any response back to the requestor.

Figure 11:
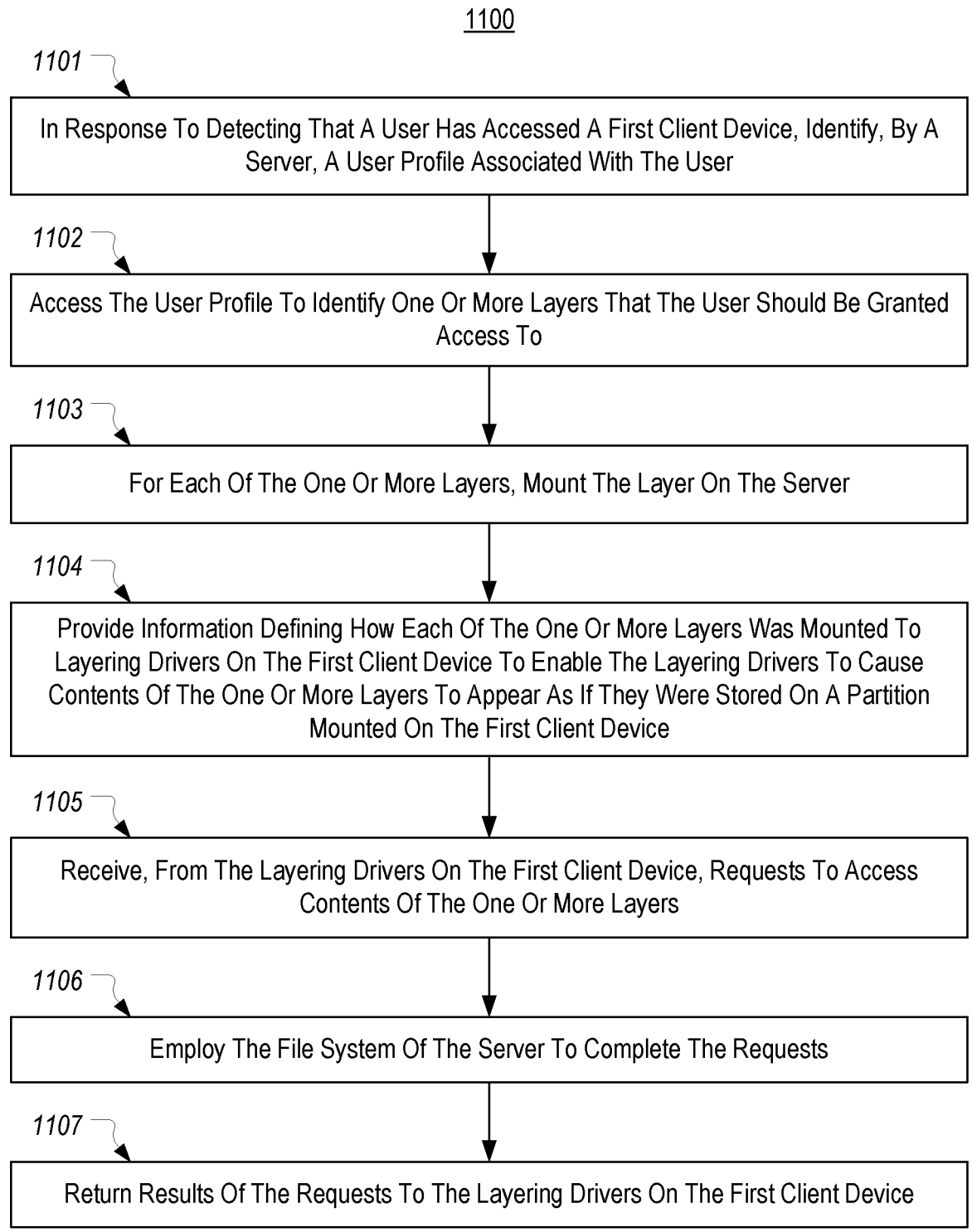
FIG. 11 illustrates a flowchart of an example method, performed by a server, for allowing a user profile to be concurrently accessed in a layering system.

FIG. 11 illustrates a flowchart of an example method 1100 for allowing a user profile to be concurrently accessed in a layering system. Method 1100 can be implemented by a server in a layering system such as server 401.

Method 1100 includes an act 1101 of, in response to detecting that a user has accessed a first client device, identifying a user profile associated with the user. For example, server 401 can identify user profile 410 when a user logs into client device 402a.

Method 1100 includes an act 1102 of accessing the user profile to identify one or more layers that the user should be granted access to. For example, server 401 can identify layer 420 as defined in user profile 410.

Method 1100 includes an act 1103 of, for each of the one or more layers, mounting the layer on the server. For example, layer 420 can be mounted on server 401.

Method 1100 includes an act 1104 of providing information defining how each of the one or more layers was mounted to layering drivers on the first client device to enable the layering drivers to cause contents of the one or more layers to appear as if they were stored on a partition mounted on the first client device. For example, proxy 450 can notify that layer 420 was mounted as the D: drive and/or that a registry hive stored on layer 420 has been loaded into the server's registry at a particular location.

Method 1100 includes an act 1105 of receiving, from the layering drivers on the first client device, requests to access contents of the one or more layers. For example, proxy 450 can receive requests to access File1.docx.

Method 1100 includes an act 1106 of employing the file system of the server to complete the requests. For example, proxy 450 can submit the request to file system 501.

Method 1100 includes an act 1107 of returning results of the requests to the layering drivers on the first client device. For example, proxy 450 can send File1.docx to layering drivers 405.

Figure 12:
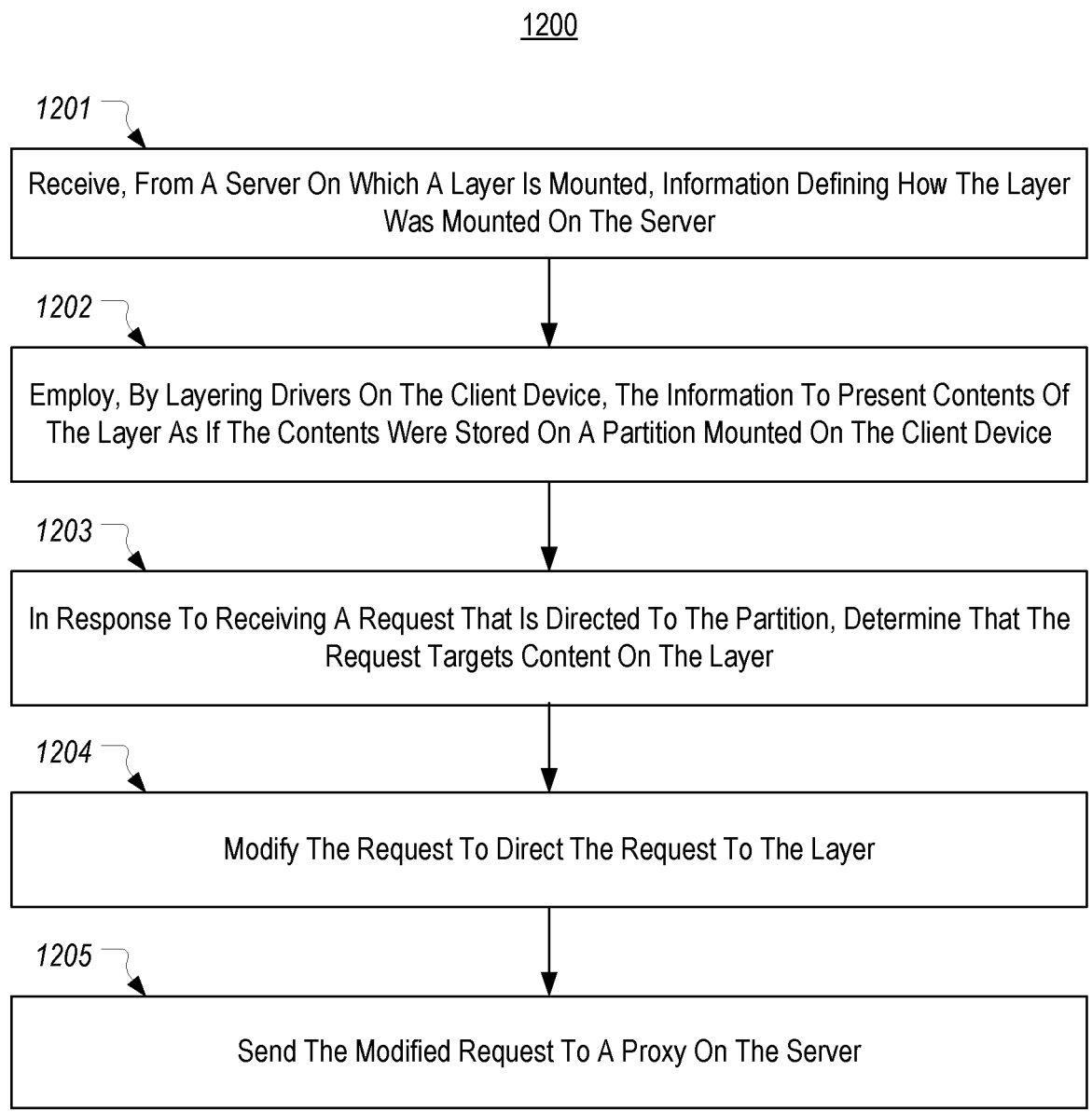
FIG. 12 illustrates a flowchart of an example method, performed by a client device, for allowing a user profile to be concurrently accessed in a layering system.

FIG. 12 illustrates a flowchart of an example method 1200 for allowing a user profile to be concurrently accessed in a layering system. Method 1200 can be implemented by a client device in a layering system such as client device 402a or client device 402b.

Method 1200 includes an act 1201 of receiving, from a server on which a layer is mounted, information defining how the layer was mounted on the server. For example, layering drivers 405 can receive information from proxy 450 indicating that layer 420 was mounted as the D: drive on server 401.

Method 1200 includes an act 1202 of employing, by layering drivers on the client device, the information to present contents of the layer as if the contents were stored on a partition mounted on the client device. For example, layering drivers 405 can employ mappings to cause the contents of layer 420 to appear as if they were stored on a C: drive on which the client device's operating system is installed.

Method 1200 includes an act 1203 of, in response to receiving a request that is directed to the partition, determining that the request targets content on the layer. For example, layering drivers 405 could identify, based on layer 420's metadata, that a request targets a file stored on layer 420 rather than on the C: drive.

Method 1200 includes an act 1204 of modifying the request to direct the request to the layer. For example, layering drivers 405 could modify the request by changing the drive letter from C: to D:.

Method 1200 includes an act 1205 of sending the modified request to a proxy on the server. For example, layering drivers 405 could package the request for transmission over a network to proxy 450.

In summary, the present invention allows content on the same layer to be concurrently accessed from multiple client devices by mounting the layer on the server and redirecting requests to access the content to the server. A device view on each client device can be employed to allow each client device to have an independent view of a concurrently accessed file. Any modifications made to the concurrently accessed file that may conflict can be resolved using a corresponding policy. Any modifications that are not persisted to the original file can still be maintained on the layer within a separate copy of the file.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a server, for allowing a user profile to be concurrently accessed in a layering system, the method comprising:
   in response to detecting that a user has accessed a first client device, identifying, by a server, a user profile associated with the user;
   accessing the user profile to identify one or more layers that the user should be granted access to;
   for each of the one or more layers, mounting the layer on the server;
   providing information defining how each of the one or more layers was mounted to layering drivers on the first client device to enable the layering drivers to cause contents of the one or more layers to appear as if they were stored on a partition mounted on the first client device;
   receiving, from the layering drivers on the first client device, requests to access contents of the one or more layers;
   employing the file system of the server to complete the requests;
   returning results of the requests to the layering drivers on the first client device;
   in response to detecting that the user has accessed a second client device, providing the information defining how each of the one or more layers was mounted to layering drivers on the second client device to enable the layering drivers on the second client device to cause the contents of the one or more layers to appear as if they were stored on a partition on the second client device;
   receiving, from the layering drivers on the second client device, additional requests to access contents of the one or more layers;
   employing the file system of the server to complete the additional requests; and
   returning results of the additional requests to the layering drivers on the second client device.

2. The method of claim 1, wherein the information defining how each of the one or more layers was mounted includes, for each layer, one or more of:
   a drive letter assigned to the layer;
   a file system path to the layer; or
   a location in the server's registry where a registry hive stored on the layer was loaded.

3. The method of claim 1, wherein the additional requests include a request to open a file that is currently opened on the first client device, the method further comprising:
   notifying a first device view on the first client device and a second device view on the second client device that the file is being concurrently accessed.

4. The method of claim 3, further comprising:
   detecting that the first client device has closed the file; and
   notifying the second device view that the file is not opened by any other client device.

5. The method of claim 4, wherein detecting that the first client device has closed the file includes detecting that the first client device did not modify the file; and
   wherein notifying the second device view includes notifying the second device view that the file was not modified by another client device.

6. The method of claim 4, wherein detecting that the first client device has closed the file includes detecting that the first client device modified the file, the method further comprising:
   detecting that the second client device has also modified the file;
   applying a policy to identify whether the modifications to the file made by the first or second client device should be persisted to the layer; and
   persisting the identified modifications to the layer.

7. The method of claim 6, further comprising:
   creating a separate file on the layer that includes the modifications that were not identified to be persisted to the layer.

8. The method of claim 7, wherein the separate file includes a timestamp identifying when the modifications were made.

9. The method of claim 1, wherein the information defining how each of the one or more layers was mounted comprises a drive letter of or a file system path to each mounted layer.

10. A method, implemented by a first client device and a second client device, for allowing a user profile to be concurrently accessed in a layering system, the method comprising:
    by the first client device:
       receiving, from a server on which a layer is mounted, information defining how the layer was mounted on the server;
       employing, by layering drivers on the first client device, the information to present contents of the layer as if the contents were stored on a first partition mounted on the first client device;

in response to receiving a first request that is directed to the first partition, determining that the first request targets content on the layer;

modifying the first request to direct the first request to the layer; and sending the modified first request to a proxy on the server; by the second client device:

receiving, from the server on which the layer is mounted, the information defining how the layer was mounted on the server;

employing, by layering drivers on the second client device, the information to present the contents of the layer as if the contents were stored on a second partition mounted on the second client device;

in response to receiving a second request that is directed to the second partition, determining that the second request targets content on the layer;

modifying the second request to direct the second request to the layer; and sending the modified second request to the proxy on the server.

11. The method of claim 10, further comprising:
receiving, at the first client device, a response to the modified first request that indicates that the targeted content is being concurrently accessed by the second client device; and caching a copy of the content in a device view.

12. The method of claim 11, further comprising:
receiving, at the first client device, a subsequent request to access the content; and accessing the copy cached in the device view to complete the subsequent request.

13. The method of claim 11, further comprising:
receiving a notification indicating that the content is no longer being concurrently accessed; and removing the cached copy from the device view.

14. The method of claim 13, wherein the cached copy was modified by the first client device, the method further comprising:

sending the modified copy to the server for storage on the layer.

15. The method of claim 14, further comprising:
including a timestamp with the modified copy identifying when the copy was modified.

16. The method of claim 10, wherein the information defining how the layer was mounted on the server includes one or more of:
a drive letter assigned to the layer;
a file system path to the layer; or
a location in the server's registry where a registry hive stored on the layer was loaded.

17. A layering system comprising:
a server that stores a number of layers that each contain user data and user profiles that each define a layer that should be mounted to the server when a corresponding user logs into a client device, the server also including a proxy for communicating file system or registry requests with client devices; and multiple client devices that each include layering drivers that are configured to cause contents of a layer mounted to the server to appear as if the contents were stored on a partition mounted on the client device, wherein the layering drivers on both the first and second client devices are configured to concurrently redirect requests to access the contents of the layer to the proxy on the server.

18. The layering system of claim 17, wherein each client device also includes a device view which is configured to cache a copy of a file obtained from the layer mounted on the server when the file is being concurrently accessed by the multiple client devices, the device view also being configured to complete requests to access the file that are received while the file is being concurrently accessed by employing the copy that is cached in the device view.

19. The layering system of claim 18, wherein the device view is configured to send the cached copy of the file to the server for storage on the layer after the file is no longer being concurrently accessed.

20. The method of claim 1, wherein each of the one or more layers is a virtual hard disk (VHD).

* * * * *